United States Patent
Mizzell, Jr.

(10) Patent No.: US 11,894,184 B2
(45) Date of Patent: Feb. 6, 2024

(54) PERMANENT MAGNETIC ASSEMBLIES AND METHODS OF ASSEMBLING SAME

(71) Applicant: Quadrant International, Inc., San Diego, CA (US)

(72) Inventor: George E. Mizzell, Jr., Hoover, AL (US)

(73) Assignee: Quadrant International, Inc., San Diego, CA (US)

( * ) Notice: Subject to any disclaimer, the term of this patent is extended or adjusted under 35 U.S.C. 154(b) by 0 days.

(21) Appl. No.: 18/045,760

(22) Filed: Oct. 11, 2022

(65) Prior Publication Data

US 2023/0113360 A1  Apr. 13, 2023

Related U.S. Application Data

(60) Provisional application No. 63/262,428, filed on Oct. 12, 2021.

(51) Int. Cl.
  *H01F 7/02* (2006.01)
  *H02K 1/02* (2006.01)

(52) U.S. Cl.
  CPC .............. *H01F 7/021* (2013.01); *H02K 1/02* (2013.01)

(58) Field of Classification Search
  CPC .......... H01F 7/021; H01F 7/0273; H02K 1/02
  See application file for complete search history.

(56) References Cited

U.S. PATENT DOCUMENTS

| | | | |
|---|---|---|---|
| 5,886,609 A * | 3/1999 | Stelter | H01F 7/0278 335/296 |
| 11,361,892 B2 * | 6/2022 | Nellessen | H01F 7/021 |
| 2008/0074223 A1 | 3/2008 | Pribonic | |
| 2021/0134501 A1 * | 5/2021 | de la Rosa | H01F 7/04 |

FOREIGN PATENT DOCUMENTS

| | | |
|---|---|---|
| CN | 102856032 B | 1/2013 |
| KR | 20100036526 A | 4/2010 |

OTHER PUBLICATIONS

K&J Magnetics, Inc., "Halbach Arrays," Captured May 20, 2019, pp. 1-9, K&J Magentics, Inc., Pennsylvania, https://www.kjmagnetics.com/blog.asp?p=halbach-arrays.

* cited by examiner

*Primary Examiner* — Mohamad A Musleh
(74) *Attorney, Agent, or Firm* — Armstrong Teasdale LLP

(57) ABSTRACT

A magnetic assembly includes magnets arranged in a Halbach array. The magnets include a first magnet and a second magnet positioned adjacent the first magnet. The first magnet and the second magnet have adjacent surfaces. A cavity is formed in the each of the adjacent surfaces and is aligned with the cavity formed in the adjacent surface of the adjacent magnet. The magnetic assembly also includes a ferromagnetic pin positioned within the aligning cavities to connect the first magnet and the second magnet. The ferromagnetic pin has a size, a shape, and a magnetic permeability that facilitate a magnetic force between the first surface and the second surface inducing a magnetic flux path through the ferromagnetic pin such that an apparent magnetic force between the first surface and the second surface is one of i) a repelling force less than 5 newtons (N) and ii) an attracting force.

20 Claims, 21 Drawing Sheets

PERMANENT MAGNETIC ASSEMBLIES AND METHODS OF ASSEMBLING SAME

CROSS-REFERENCE TO RELATED APPLICATION

This application claims priority to U.S. Provisional Patent Application Ser. No. 63/262,428, filed on Oct. 12, 2021, the disclosure of which is hereby incorporated by reference in its entirety.

BACKGROUND

This disclosure is directed to permanent magnetic assemblies, and, more specifically, to permanent magnetic assemblies arranged in a Halbach array.

Permanent magnets include two poles, a north pole and a south pole, and generate magnetic flux lines corresponding to a magnetic field running from the north pole to the south pole. Arrangements of permanent magnets are used to produce different magnetic field patterns for different applications. For example, in a Halbach array, permanent magnets are arranged such that a magnetic field density on one side of the array is substantially greater than that on the other side of the array. This property is useful in various applications, such as in electric motors. Adjacent magnets in a Halbach array experience opposing magnetic forces. These forces produce a torque about a point of rotation in the magnets. As such, an adhesive and/or other means for securing the magnets together is typically used to join the magnets of the Halbach array together and prevent the magnets from repelling away from one another. The addition of the adhesive or other means to secure the magnets together increases the manufacturing cost and complexity of such Halbach arrays, and because adhesive may fail over time, reduces the operating lifetime of the Halbach array. Personnel safety is also a consideration in handling larger magnets when assembling them into an array.

BRIEF DESCRIPTION OF THE DISCLOSURE

In one aspect, a magnetic assembly includes a plurality of magnets arranged in a Halbach array. The Halbach array has a strong side facing a first direction and a weak side facing a second direction opposite the first direction. The plurality of magnets includes a first magnet and a second magnet positioned adjacent the first magnet. The first magnet has a first surface and the second magnet has a second surface adjacent the first surface. At least one first cavity is formed in the first magnet and extends inward from the first surface. At least one second cavity is formed in the second magnet and extends inward from the second surface. The first and second cavities are aligned along a third direction perpendicular to the first direction and the second direction. The magnetic assembly also includes at least one ferromagnetic pin positioned within the at least one first cavity and the at least one second cavity to connect the first magnet and the second magnet. The at least one ferromagnetic pin has a size, a shape, and a magnetic permeability that facilitate a magnetic force between the first surface and the second surface in the third direction inducing a magnetic flux path through the at least one ferromagnetic pin such that an apparent magnetic force in the third direction between the first surface and the adjacent second surface is one of i) a repelling force less than 5 newtons (N) and ii) an attracting force.

In another aspect, a magnetic assembly includes a plurality of magnets arranged in a linear Halbach array. The Halbach array has a strong side facing a first direction and a weak side facing a second direction opposite the first direction. Each of the plurality of magnets is shaped as a radial arc segment of the Halbach array and has opposing radial end surfaces. An arc length of the Halbach array increases as the Halbach array extends along a longitudinal axis that is oriented perpendicular to the first direction and the second direction. Each of the plurality of magnets has a through-hole defined therein that extends from one radial end surface to the other radial end surface. Each through-hole is longitudinally aligned with a through-hole defined within an adjacent magnet. The magnetic assembly also includes a ferromagnetic pin positioned within each through-hole to connect adjacent magnets. The ferromagnetic pin has a size, a shape, and a magnetic permeability that facilitate a magnetic force between a respective pair of adjacent magnets in the longitudinal direction inducing a magnetic flux path through the ferromagnetic pin such that an apparent magnetic force between each pair of adjacent magnets is one of i) a repelling force less than 5 newtons (N) and ii) an attracting force.

In another aspect, a method of assembling a magnetic assembly including a first magnet and a second magnet arranged in a Halbach array includes selecting a size of a ferromagnetic pin to connect the first magnet and the second magnet. The size of the ferromagnetic pin is selected based on (i) a reduction in a magnetic repelling force between the first magnet and the second magnet resulting from the ferromagnetic pin and (ii) a reduction in a magnetic field strength of the Halbach array resulting from cavities formed in the first magnet and the second magnet to accommodate the ferromagnetic pin having the selected size. The method also includes inserting the ferromagnetic pin having the selected size into cavities in the first magnet and the second magnet to connect the first magnet and the second magnet.

DETAILED DESCRIPTION OF THE DISCLOSURE

Figure 1:
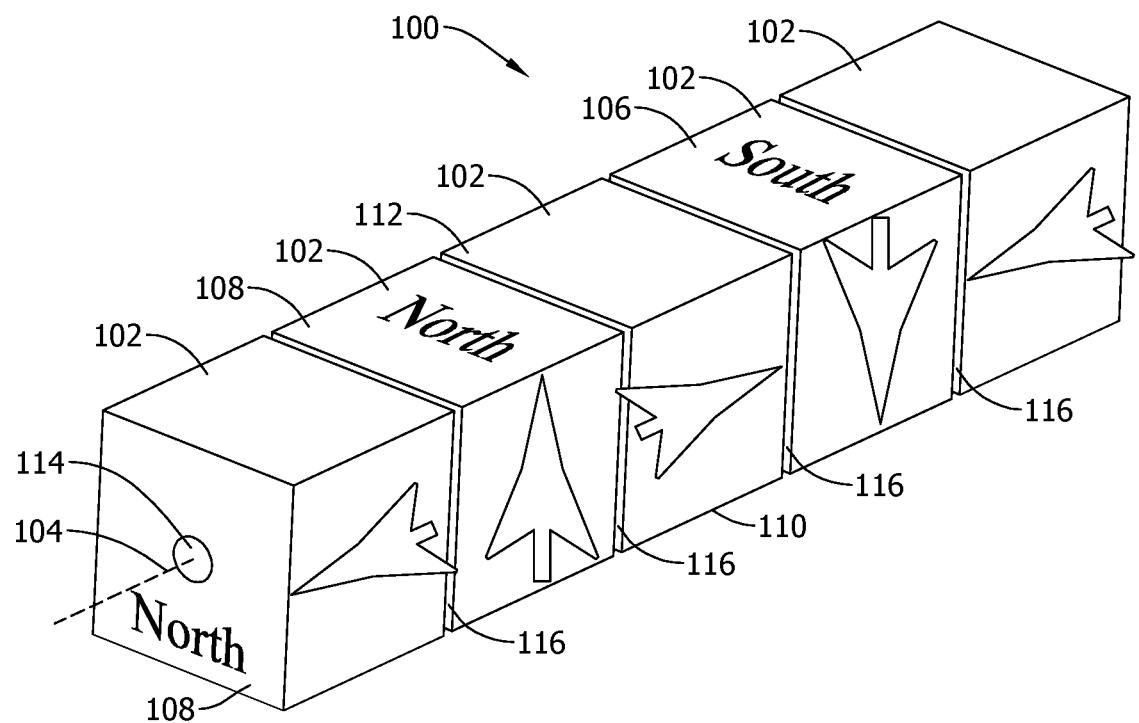
FIG. 1 is a perspective view of an example magnetic assembly in a partially assembled state.

Magnetic assemblies of the present disclosure provide improved Halbach arrays. For example, magnetic assemblies of the present disclosure include pins or rods of a selected size, shape, and position to join permanent magnets of a Halbach array by reducing or substantially eliminating repelling magnetic forces characteristically present between adjacent magnets of a Halbach array. Accordingly, embodiments of the magnetic assemblies disclosed herein provide a Halbach array that does not require adhesives or other means to join adjacent magnets together, which reduces the cost and complexity of manufacture and extends the operational lifetime of the Halbach array.

As known in the art, the term "Halbach array" refers to an arrangement of permanent magnets that augments magnetic field on one side of the array (also referred to herein as a "strong side" of the array) while reducing the magnetic field on the other side of the array (also referred to herein as a "weak side" of the array) using a spatially rotating pattern of magnetization of the permanent magnets.

In one embodiment, the magnetic assembly includes a plurality of magnets arranged in a Halbach array. The Halbach array has a strong side facing a first direction and a weak side facing a second direction opposite the first direction. The plurality of magnets includes a first magnet and a second magnet positioned adjacent the first magnet. The first magnet includes a first surface and the second magnet includes a second surface adjacent the first surface. The first magnet includes at least one (one or more than one) first cavity formed in the first surface and extending inward from the first surface. The second magnet includes at least one (one or more than one) second cavity formed in the second surface and extending inward from the second surface. The at least one first cavity and the at least one second cavity are aligned along a third direction that is perpendicular to the first direction and the second direction. The magnetic assembly further includes at least one ferromagnetic pin positioned within the at least one first cavity and the at least one second cavity. The at least one ferromagnetic pin has a size, a shape, and a magnetic permeability sufficient to create a magnetic flux path between the first magnet and the second magnet in the third direction. As described in detail herein, the creation of the magnetic flux path facilitates reducing a repelling magnetic force that otherwise exists between the first magnet and the second magnet in the third direction. The repelling magnetic force may be reduced to within a targeted threshold (e.g., less than 5 newtons (N) of repelling force between the first magnet and the second magnet) or may be reduced such that a net attracting force (e.g., of between 1 N and 10 N) exists between the first magnet and the second magnet in the third direction. By using ferromagnetic pin(s) to reduce, or eliminate, the repelling magnetic force between the first magnet and the second magnet, a need for adhesives to bond the first magnet to the second magnet may be reduced or eliminated. In some embodiments, the magnetic assembly may include any suitable number of additional magnets and ferromagnetic pins similarly arranged, such that a force that exists between each pair of adjacent magnets is reduced to a repelling force within the targeted threshold or transitions to a net attracting force. The Halbach array may be, for example, a linear Halbach array, a cylindrical Halbach array, or another type of Halbach array.

In some embodiments, the ferromagnetic pin(s) are sized, shaped, and have a magnetic permeability sufficient to create at least a minimal net attracting force between magnets within the Halbach array, while making minimal or limited impact on the net magnetic force of the Halbach array on the strong side. In some embodiments, such as relatively large Halbach arrays, multiple smaller ferromagnetic pin(s) may be used to limit or reduce the amount of magnetic material removed from the magnets in order to form the cavities for the ferromagnetic pin(s), while still providing a sufficient flux path to maintain a net attracting force between adjacent magnets. Suitably, the ferromagnetic pin(s) are sized and shaped such that the amount of magnetic material removed from the magnets of the Halbach array to create the cavities for the ferromagnetic pin(s) reduces a magnetic field strength of the Halbach array by 5% or less.

As used herein, the term "magnetic permeability" refers to the ability of a material (e.g., a ferromagnetic material) to support the formation of a magnetic field within the material in response to an applied magnetic field. The magnetic permeability may be measured in henries (H) per meter (m) (H·m$^{-1}$), or equivalently, volt-seconds (V-s) per ampere-meters (A-m), or newtons per ampere squared (N·A$^{-2}$). Magnetic permeability is typically represented by the Greek letter μ. Magnetic permeability may also be described in terms of a relative permeability ($\mu/\mu_0$), where $\mu_0$ is the permeability of free space ($4\pi \times 10^{-7}$ H·m$^{-1}$).

The magnetic permeability μ of a material can be represented by the equation $\mu=B/H$, where B is the flux density, which may be measured in tesla or $V \cdot s \cdot m^{-2}$, and H is the magnetizing force of the applied magnetic field (also referred to as the magnetizing field), which may be measured in $A \cdot m^{-1}$. The flux density B (also referred to as magnetic flux density or magnetic inductance) is the number of lines of force passing through a unit area of the material. The magnetizing force induces the lines of force through the material. The magnetic permeability of a material therefore governs the magnetic flux able to pass through an object made from the material having a given volume. That is, for objects having the same volumetric shape, objects made from a material having a greater magnetic permeability are able to carry a greater magnetic flux, that is, a greater amount of magnetic flux may pass through the object, in response to the same magnetizing force. The amount of magnetic flux that passes through an object may also be referred to as magnetization of the object. As the material reaches a saturation flux density or a saturation level, an increase in the magnetizing force does not appreciably increase the flux density or the magnetization (although the flux density may continue to increase at a significantly smaller rate due to paramagnetism). The saturation flux density is a magnetic characteristic of a material and changes between materials (e.g., changes between different ferromagnetic materials).

As used herein, the terms "ferromagnetic" or "ferromagnetic material" refer to a material having a magnetic permeability that enables the material to be magnetized in response to an applied magnetic field. This may be due to the presence of unpaired electrons. Non-limiting examples of ferromagnetic materials include iron, nickel, cobalt, alloys of one or more of these elements, ferritic stainless steel, and low carbon steel.

As used herein, the term "permanent magnet" refers to a material that creates a persistent magnetic field in the absence of an externally applied magnetic field. Ferromagnetic materials may also be permanent magnets. Non-limiting examples of permanent magnets include samarium cobalt magnets, neodymium magnets, alnicos (iron alloys that include aluminum, nickel, and cobalt), and ceramic magnets (ferrites).

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 2:
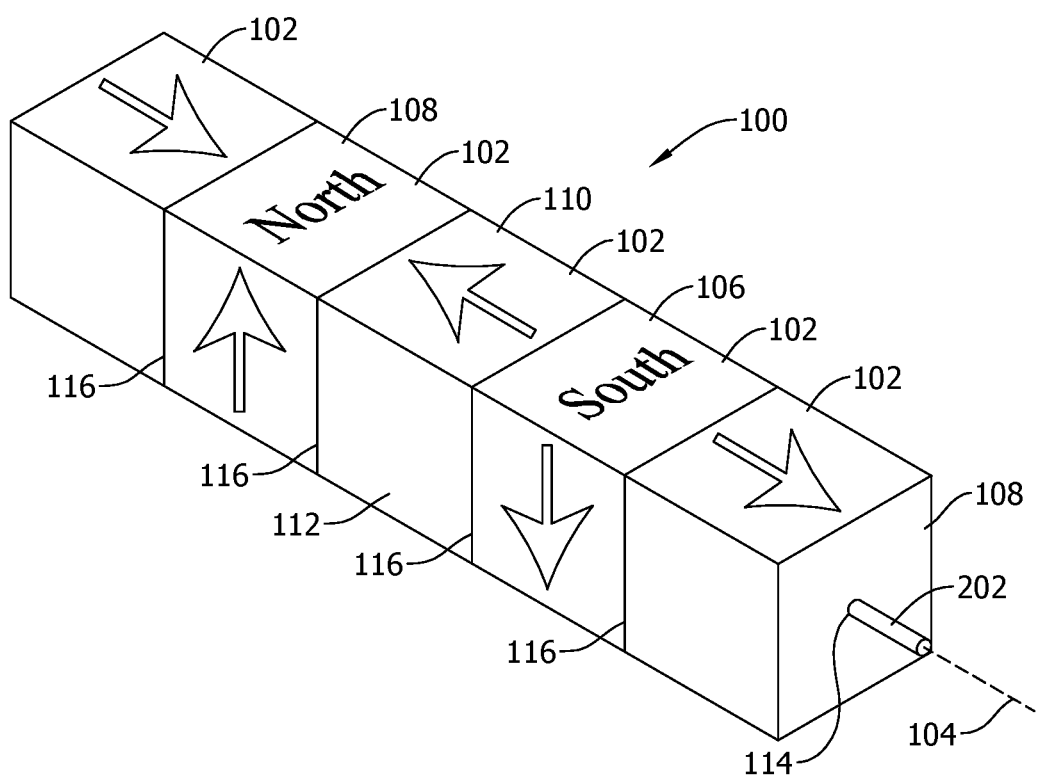
FIG. 2 is a perspective view of the example magnetic assembly shown in FIG. 1 in an assembled state with a holding pin in position.

FIGS. 1 and 2 illustrate an example magnetic assembly 100 including a plurality of magnets 102 arranged in a linear Halbach array along an axis 104. Each magnet 102 has a north-south polarity, indicated by an arrow shown on each magnet 102, with the arrow pointing from a south pole 106 towards a north pole 108 of each magnet 102. The magnetic field generally runs from south pole 106 to north pole 108 of each magnet 102, and a combined magnetic field of magnets 102 is formed by superimposing the magnetic field of each magnet 102. Magnets 102 are arranged with a rotating pattern of magnetization, such that an axis of polarization of each magnet 102 is shifted or alternated with respect to adjacent magnets 102, for example, by 90 degrees, about an axis perpendicular to axis 104. Due to this arrangement, a magnetic field density on one side 110 (the lower side as shown in FIG. 1 and upper side as shown in FIG. 2, also referred to herein as the "strong side") is significantly greater than the magnetic field density on the other side 112 (the upper side as shown in FIG. 1 and the lower side as shown in FIG. 2, also referred to herein as the "weak side"). The first side 110 and the second side 112 face opposite directions, irrespective of an orientation of the magnetic assembly 100. In some embodiments, for example, there is no substantial magnetic field on weak side 112 of magnetic assembly 100.

As shown in FIG. 2, magnetic assembly 100 further includes at least one ferromagnetic rod or pin 202. In certain embodiments, the ferromagnetic pin 202 is formed of a ferromagnetic material selected from the group consisting of ferritic stainless steel, low carbon steel, and iron-cobalt alloys. The ferromagnetic pin 202 extends through a geometric center of each of the magnets 102 and through the entirety of the magnetic assembly 100. Cavities 114 are formed in the center of each magnet 102 and the cavities 114 of adjacent magnets 102 align along the axis 104 and receive the pin 202. As shown in FIGS. 1 and 2, the example magnetic assembly 100 is a linear Halbach array with the aligning cavities 114 of the magnets 102 forming a linearly-extending through-hole in the magnetic assembly 100 along the axis 104, and the ferromagnetic pin 202 also extends linearly through the through-hole.

The magnets 102 are suitably permanent magnets that each create a persistent magnetic field to enable the magnetic assembly 100 to function as described herein. Non-limiting examples of permanent magnets used as the magnets 102 include samarium cobalt magnets, neodymium magnets, alnicos (iron alloys that include aluminum, nickel, and cobalt), and ceramic magnets (ferrites). In certain embodiments, the magnets 102 are permanent rare earth magnets selected from the group consisting of samarium cobalt magnets and neodymium magnets. Various grades of permanent magnets 102 may be used, and may be selected based on desired magnetic properties of the magnets 102. For example, in some instances, permanent magnets 102 may be demagnetized over time by magnetic interaction with the magnetic fields of adjacent magnets 102. Demagnetization may be exacerbated at increased temperatures that may be experienced by the magnets 102 in operation of the magnetic assembly 100. Certain grades of rare earth permanent magnets now known or subsequently developed that improve resistance to demagnetization may suitably be utilized as the permanent magnets 102.

Suitably, the ferromagnetic pin 202 has a magnetic permeability that enables magnetization of the ferromagnet pin 202 at locations between adjacent magnets 102. The magnetic permeability is dependent on the ferromagnetic material utilized for the ferromagnetic pin 202. Non-limiting examples of ferromagnetic materials suitable for used as the ferromagnetic pin 202 include iron, nickel, cobalt, alloys of one or more of these elements, ferritic stainless steel, and low carbon steel. In certain embodiments, the ferromagnetic pin 202 is made from a ferromagnetic material selected from the group consisting of ferritic stainless steel, low carbon steel, and iron-cobalt alloys.

In Halbach arrays, such as the magnetic assembly 100, the adjacent magnets 102 create a repelling magnetic force therebetween. The direction of the repelling magnetic force between adjacent magnets 102 is substantially perpendicular to the direction of the strong side 110 and the weak side 112 of the magnetic assembly 100, and may causes translational and/or rotational movement of the adjacent magnets 102 relative to the axis 104. The ferromagnetic pin 202 extends between adjacent magnets 102 in the direction of the repelling magnetic force, and the magnetic permeability of the ferromagnetic pin 202 enables the repelling magnetic force to induce a magnetic flux that passes through the ferromagnetic pin 202. Thereby, a magnetic flux path is created in the ferromagnetic pin 202.

The amount of magnetic flux that is able to pass through the ferromagnetic pin 202 depends on the magnetic permeability of the ferromagnetic pin 202, which correlates to the flux density, as well as the volumetric shape of the pin 202, which controls the cross-sectional area through which the magnetic flux passes. In certain embodiments, the ferromagnetic pin 202 is a cylinder or is prism-shaped (e.g., a rectangular prism, a triangular prism, or other polygonal prism), with a suitable length to extend through the entirety of the magnetic assembly 100. The ferromagnetic pin 202 is not limited to cylinders or prism shapes and may have any elongate shape, for example any elongate shape that has a substantially constant cross-section along a central region. The volume of the ferromagnetic pin 202 may be controlled by adjusting the cross-sectional area (e.g., the diameter for cylindrical ferromagnetic pins 202). As the cross-sectional area of the ferromagnetic pin 202 increases, at a constant magnetic permeability, a greater magnetic flux may pass through the pin 202. However, as the cross-sectional area of the ferromagnetic pin 202 increases, the amount of magnetic material that is removed from each magnet 102 to form the cavities 114 also increases. That is, the cavities 114 define a void space volume in the magnetic assembly, and the absence of magnetic material in these areas reduces a magnetic field strength of the magnetic assembly 100. Suitably, the ferromagnetic pin 202 is sized (e.g., has a cross-sectional area) such that the magnetic material removed from the magnets 102 (i.e., the void space volume created in the magnetic assembly 100) reduces a magnetic field strength of the magnetic assembly 100 by 5% or less. The percent reduction of the magnetic field strength of the magnetic assembly 100 is determined as the magnetic field strength at the strong side 110 relative to the magnetic field strength at the strong side for an assembly without the cavities 114 in the magnets 102. To balance the size restrictions on the ferromagnetic pin 202, ferromagnetic materials having a greater magnetic permeability may be utilized to increase the flux density of the pin 202.

In some embodiments, such as that shown in FIGS. 1 and 2, the ferromagnetic pin 202 is cylindrical. Each magnet 102 includes a cavity 114 sized and shaped to receive a portion of the ferromagnetic pin 202 therein. In the illustrated embodiment, each cavity 114 is a through-hole 114 that extends entirely through the magnet 102 between opposing surfaces 116 of the magnet 102 that each face an adjacent surface 116 of an adjacent magnet 102 when the magnetic assembly 100 is assembled. In other embodiments, instead of forming a through-hole, a cavity 114 may be formed in each opposing surface 116 of the magnet 102 that faces an adjacent surface 116 of an adjacent magnet 102, and the cavities 114 extend inward from the respective surface 116 and terminate at a bulk, solid region interposed between and separating the cavities 114 in the respective magnet 102. In the illustrated embodiment, a single cavity 114 is formed in each magnet 102 at the opposing surfaces 116. In other embodiments, multiple cavities 114 may be formed in each surface 116 that faces an adjacent surface 116 of an adjacent magnet 102. The multiple cavities 114 may form multiple through-holes 114 with the cavities formed at the opposing surface 116 of the magnet 102, or may be separated by a solid region of the magnet 102.

When the magnetic assembly 100 is assembled, the through-hole 114 of each magnet 102 aligns along the linear axis 104 with the through-hole 114 of an adjacent magnet 102. The ferromagnetic pin 202 is at least partially disposed in each through-hole 114 of the magnets 102. For example, as shown in FIG. 2, the magnets 102 may be aligned to enable pin 202 to extend linearly though each respective through-hole 114 along the axis 104. That is, in the embodiment of FIGS. 1 and 2, a single ferromagnetic pin 202 extends through every magnet 102 in the magnetic assembly 100. In other embodiments, magnetic assembly 100 may include a plurality of ferromagnetic pins 202, where each ferromagnetic pin 202 extends into the cavity 114 of two adjacent magnets 102 (see, e.g., FIGS. 5-7). In embodiments where multiple ferromagnetic pins 202 are used, the magnetic permeability and/or volumetric shape of each ferromagnetic pin 202 may be suitably selected to enable the magnetic assembly 100 to function as described herein and, in particular, to facilitate reducing or eliminating the magnetic repelling force between adjacent magnets 102 in a direction perpendicular to the strong side 110 and the weak side 112.

In the absence of the ferromagnetic pin 202, the magnets 102 arranged in a Halbach array that are adjacent one another (e.g., meeting or adjoining at an adjacent surface 116) magnetically repel one another. Magnetic repelling forces between the adjacent magnets 102 cause translational and/or rotational displacement of the magnets 102 relative to the axis 104. The ferromagnetic pin 202 is suitably sized and shaped (i.e., has a suitable volumetric shape) and has a suitable magnetic permeability such that a repelling magnetic force between adjacent magnets 102 is reduced or eliminated entirely (i.e., resulting in an attracting force between adjacent magnets 102). Specifically, the magnetic permeability of the ferromagnetic pin 202 enables the repelling magnetic force between adjacent magnets 102 to induce a magnetic flux that passes through the ferromagnetic pin 202 between the adjacent magnets 102. The induction of the magnetic flux path in the ferromagnetic pin 202 reduces the apparent magnetic force between the adjacent magnets. The magnetic permeability and the volumetric shape control the amount of magnetic flux able to pass through the ferromagnetic pin 202 between adjacent magnets 102, and are suitably selected so that the amount of magnetic flux induced in the ferromagnetic pin 202 causes a sufficient reduction in the apparent magnetic force between the adjacent magnets such that the repelling force is reduced, in some embodiments, to less than 5 N or transitions to an attracting force. In embodiments, where the apparent force between adjacent magnet 102 is a reduced repelling force, the repelling force may be less than 5 N, less than 4 N, less than 3 N, less than 1 N, less than 9 N, about 5 N, about 4 N, about 3 N, about 2 N, about 1 N, such as between 1 N and 5 N. In embodiments, where the apparent force between adjacent magnet 102 transitions to an attracting force, the attracting force may be greater than 1 N, greater than 3 N, greater than 5 N, greater than 7 N, greater than 9 N, about 1 N, about 2 N, about 3 N, about 4 N, about 5 N, about 6 N, about 7 N, about 8 N, about 9 N, about 10 N, such as between 1 N and 10 N.

Reference made herein to attracting and repelling force is expressed as an absolute value, and it will be understood that a repelling force and an attracting force having equivalent absolute values reflects an equivalence between the magnitude of the forces, not an equivalence between the direction and/or orientation of the forces.

As such, when the magnets 102 are arranged on the ferromagnetic pin 202, with the ferromagnetic pin 202 extending through the aligning through-holes 114 of the magnets 102, the repelling magnetic force between magnets 102 is reduced or eliminated which enables the magnetic assembly 100 to be held in a desired shape and alignment (i.e., without substantial translation and/or rotation of the magnets 102 relative to the axis 104). Thereby, the ferromagnetic pin 202 facilitates reducing or eliminating the need for adhesives and/or mechanical devices (e.g., clamps) that are otherwise used to hold the magnetic assembly 100 together. In the absence of adhesives, the adjacent surface 116 of adjacent magnets 102 are in face-to-face contact. While a presence of the ferromagnetic pin 202 may reduce or eliminate a need for adhesives and other mechanical devices to hold the assembly 100, in some embodiments, adhesives are applied to adjacent surfaces 116 to further strengthen bonding between magnets 102. The through-holes 114 and the ferromagnetic pin 202 may also be suitably sized and shaped to create an interference fit that holds each magnet 102 on the ferromagnetic pin 202. Additionally or alternatively, the presence of the ferromagnetic pin 202 may enable the magnets 102 to be held in place on the ferromagnetic pin 202 due to the torque produced by a repelling force that may remain, albeit reduced, between the adjacent magnets 102. Specifically, the repelling force between adjacent magnets 102 may urge or bias one of the adjacent magnets 102 in a rotational direction, creating increased interference between the pin 202 and the magnet 102, holding the torqued magnet 102 in place.

The size and shape (i.e., the volumetric shape) of the ferromagnetic pin 202 that enables such a reduction in repelling magnetic force depends on factors such as the magnetic permeability of the pin 202, the magnetic properties of magnets 102, an overall arrangement of magnetic assembly 100, a presence of other objects in proximity to magnetic assembly 100 that may affect its magnetic field, and the position of the pin 202 between adjacent magnets 102. The saturation flux density of the ferromagnetic pin 202 is also suitably greater than the flux density required to be induced in the ferromagnetic pin 202 in order to facilitate reducing the repelling magnetic force between adjacent magnets. In view of these considerations, for a given magnetic assembly 100, a shape, size, and position for the ferromagnetic pin 202 may be determined by analyzing (e.g., using finite element analysis) the forces present in the magnetic assembly 100 for a number of differently size, shape, and position combinations, for ferromagnetic pins 202 having the same and/or different magnetic permeabilities, and identifying one or more combinations that satisfy the operating requirements of magnetic assembly 100, such as those that minimize or reduce below a threshold the repelling force between adjacent magnets 102. Details of such a determinations are described elsewhere herein.

Figure 3:
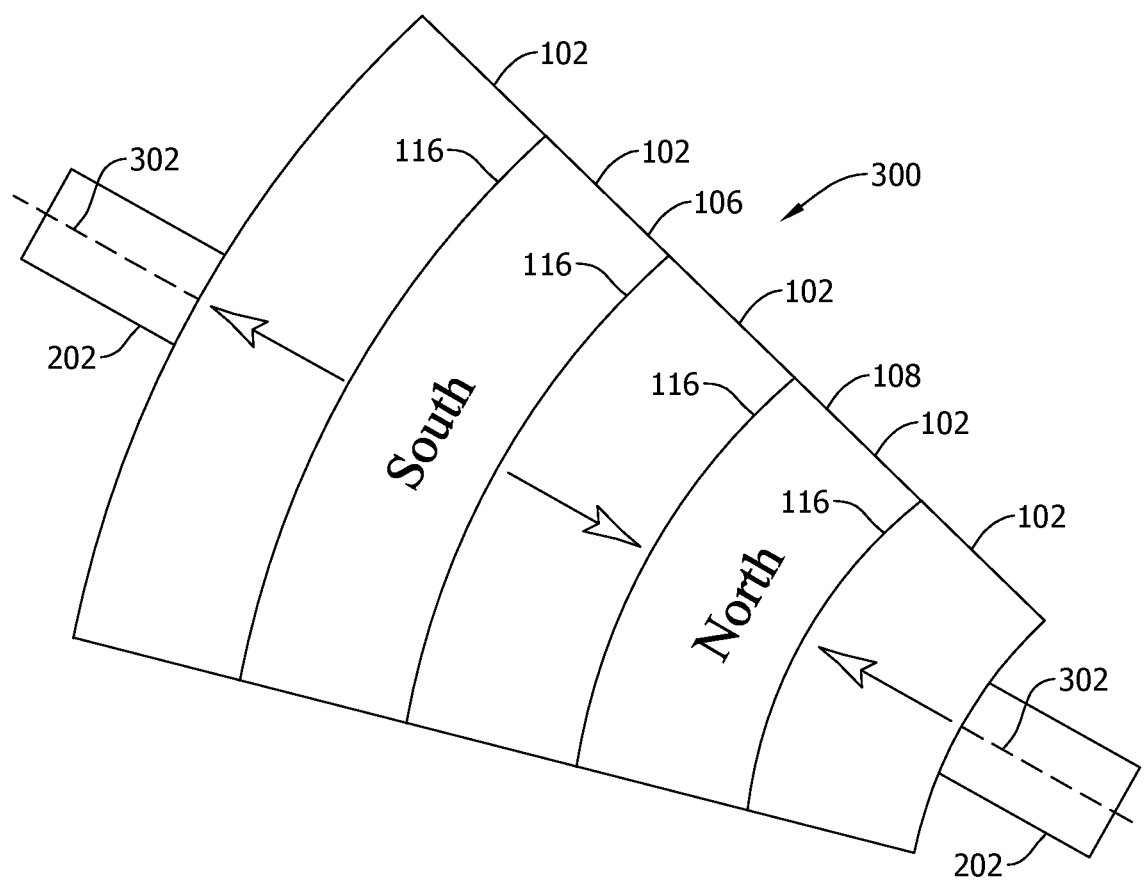
FIG. 3 is a perspective view of another example magnetic assembly, illustrated in the form of a 30° section of a 12 section motor. This assembly is a Halbach set from inner radius to outer radius.
Figure 4:
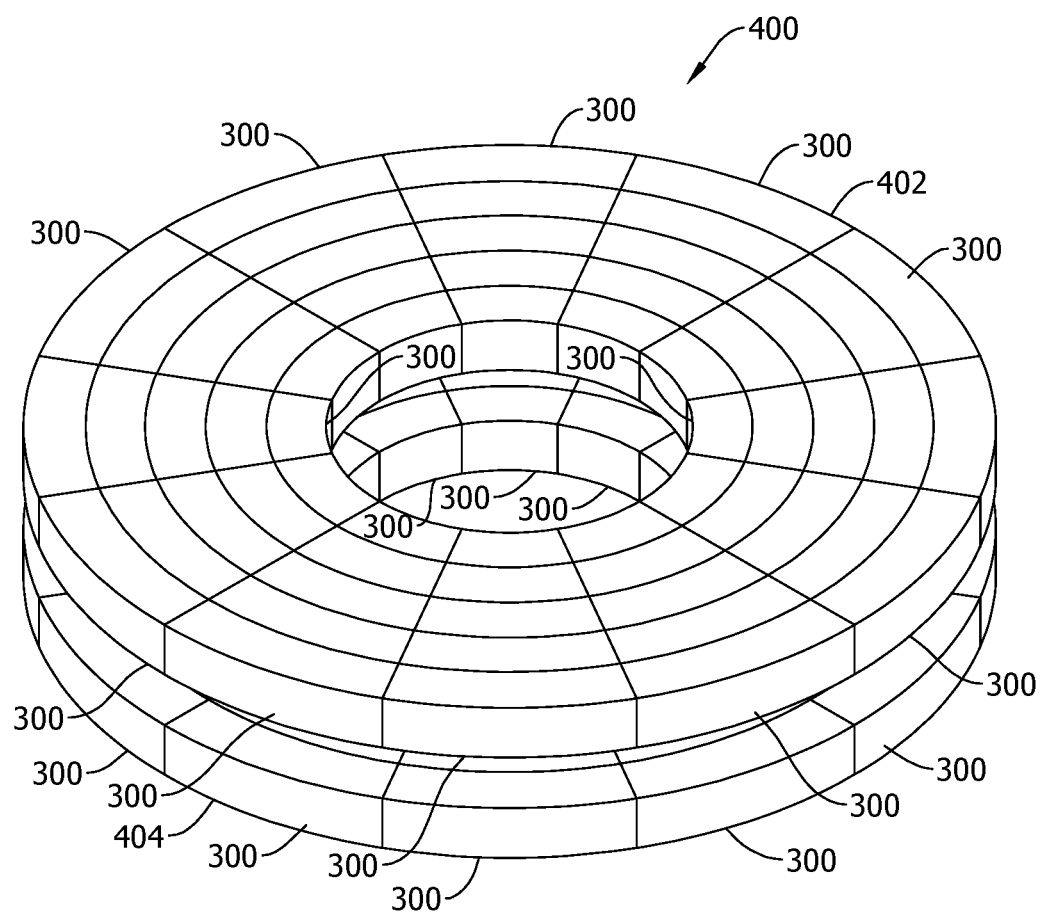
FIG. 4 is a perspective view of an example motor assembly that includes the magnetic assembly shown in FIG. 3.

FIG. 3 illustrates another example magnetic assembly 300. Like magnetic assembly 100 shown in FIGS. 1 and 2, magnetic assembly 300 is a linear Halbach array. Magnetic assembly 300 includes magnets 102 and at least one ferromagnetic pin 202, which generally function as described with respect to FIGS. 1 and 2. In the embodiment shown in FIG. 3, magnets 102 are shaped as radial arc segments with arc lengths that progressively increase along axis 302, such that, together, magnets 102 define a wedge shape. Adjacent magnets 102 are connected by the ferromagnetic pin 202 extending through aligning through-holes defined in each magnet 102 and extending between the radial end surfaces 116 of each magnet 102. The adjacent radial end surfaces 116 of adjacent magnets 102 may be in face-to-face contact. The through-hole defined in each of the magnets 102 may extend through a center of each radial end surface 116 of the respective magnet 102. In some embodiments, one or more of the pairs of the adjacent magnets 102 in the magnetic assembly 300 has multiple pairs of aligning through-holes defined in each of the pair of adjacent magnets 102, and each pair of aligning through-holes has a ferromagnetic pin 202 positioned therein to connect the pair of adjacent magnets 102. As shown in FIG. 4, a plurality of magnetic assemblies 300 may be arranged into a motor assembly 400 forming an upper disk 402 and a lower disk 404 from magnetic assemblies 300. More specifically, each of upper disk 402 and lower disk 404 may be formed by positioning a plurality of magnetic assemblies 300 adjacent one another along circumferential ends of each magnetic assembly 300 to form a disk. By positioning each magnetic assembly 300 with its respective strong side 110 oriented toward a central space between upper disk 402 and lower disk 404, a magnetic field may be substantially contained within the space between upper disk 402 and lower disk 404. Motor assembly 400 may be used in, for example, an electric motor, an alternator, or another rotating electric device. In the illustrated embodiment, each of the upper disk 402 and the lower disk 404 of the motor assembly 400 includes 12 Halbach sets or assemblies 300. Each assembly 300 of the upper disk 402 is aligned with an assembly 300 of the lower disk 404, with the strong sides 110 of aligning assemblies 300 oriented toward each other. In other embodiments, each of the upper disk 402 and the lower disk 404 of the motor assembly 400 may include greater than or fewer than 12 Halbach sets or assemblies 300. The upper disk 402 and the lower disk 404 include the same number of Halbach sets or assemblies 300, or may include a different number of Halbach sets or assemblies 300.

Figure 5:
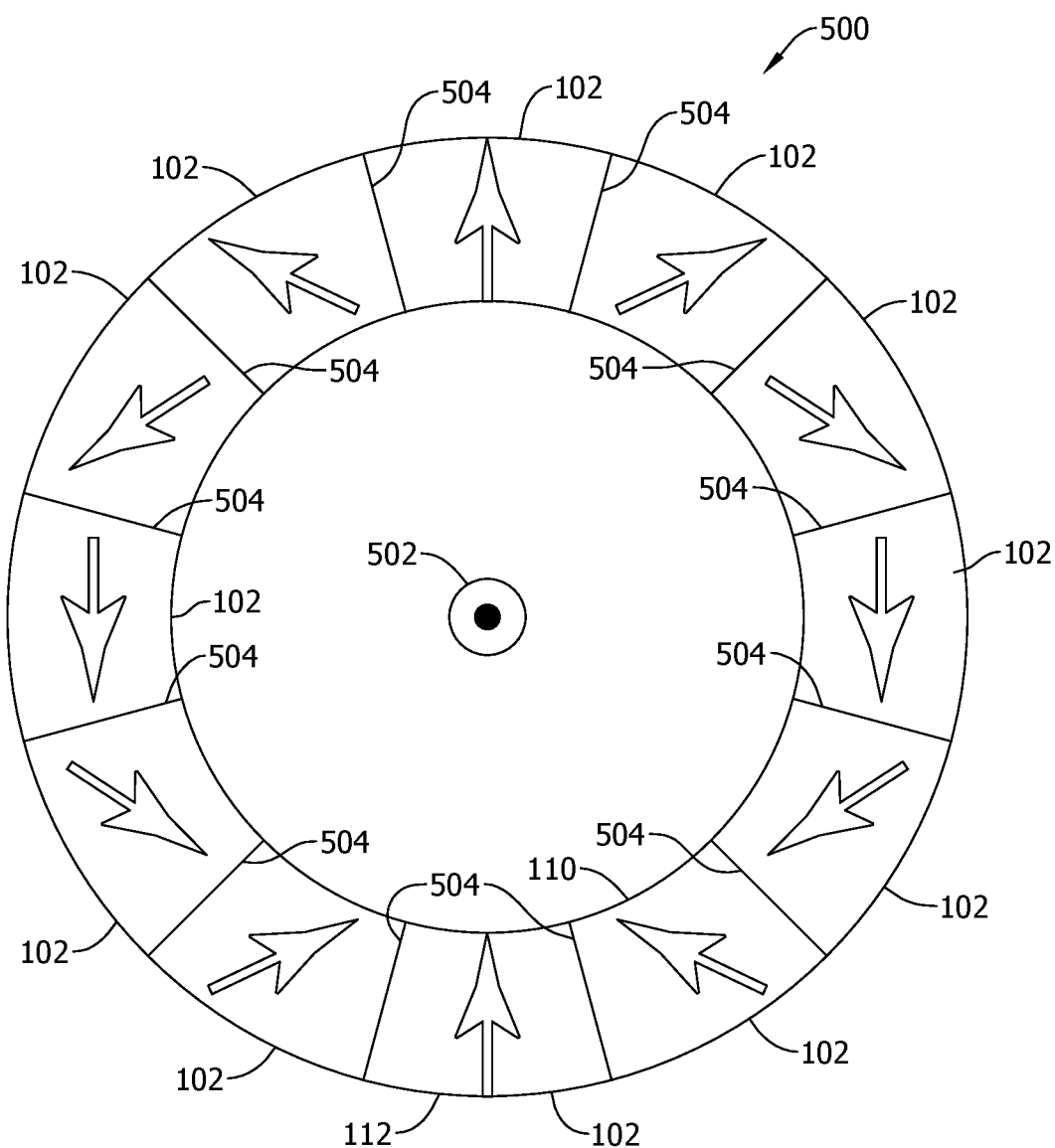
FIG. 5 is a plan view of another example Halbach magnetic assembly.
Figure 6:
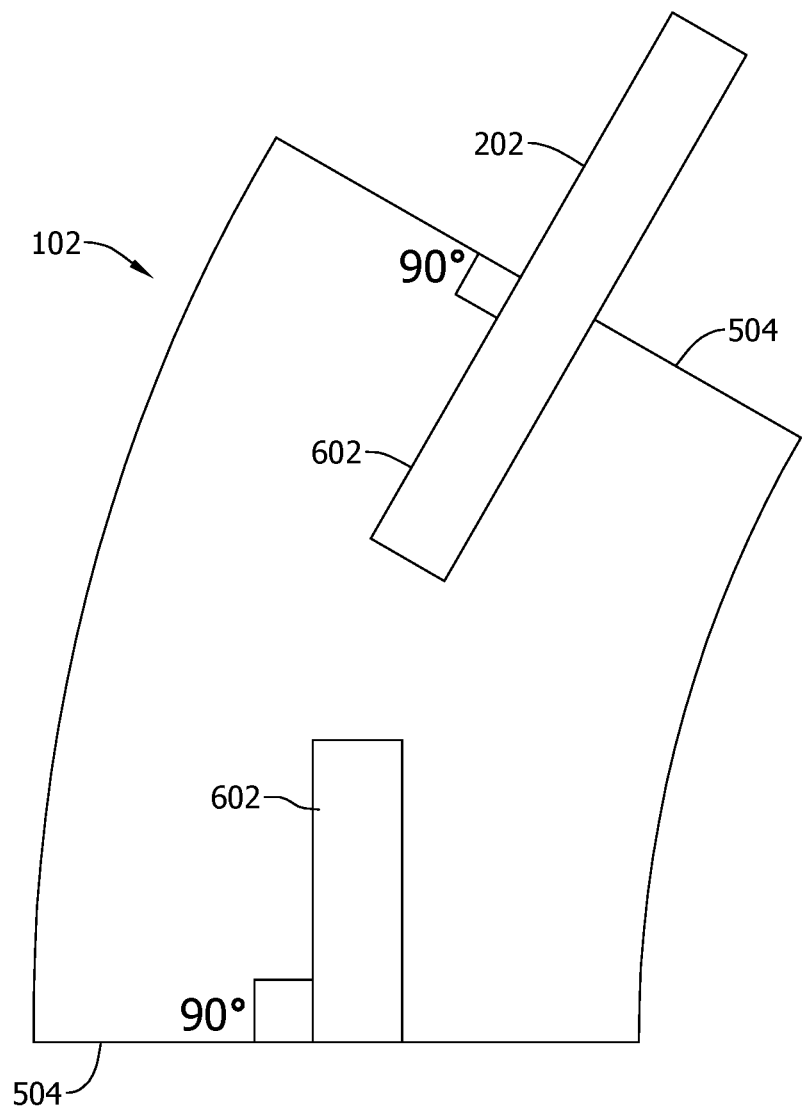
FIG. 6 is a sectional view of an example magnet and pins that may be used in the magnetic assembly shown in FIG. 5.
Figure 7:
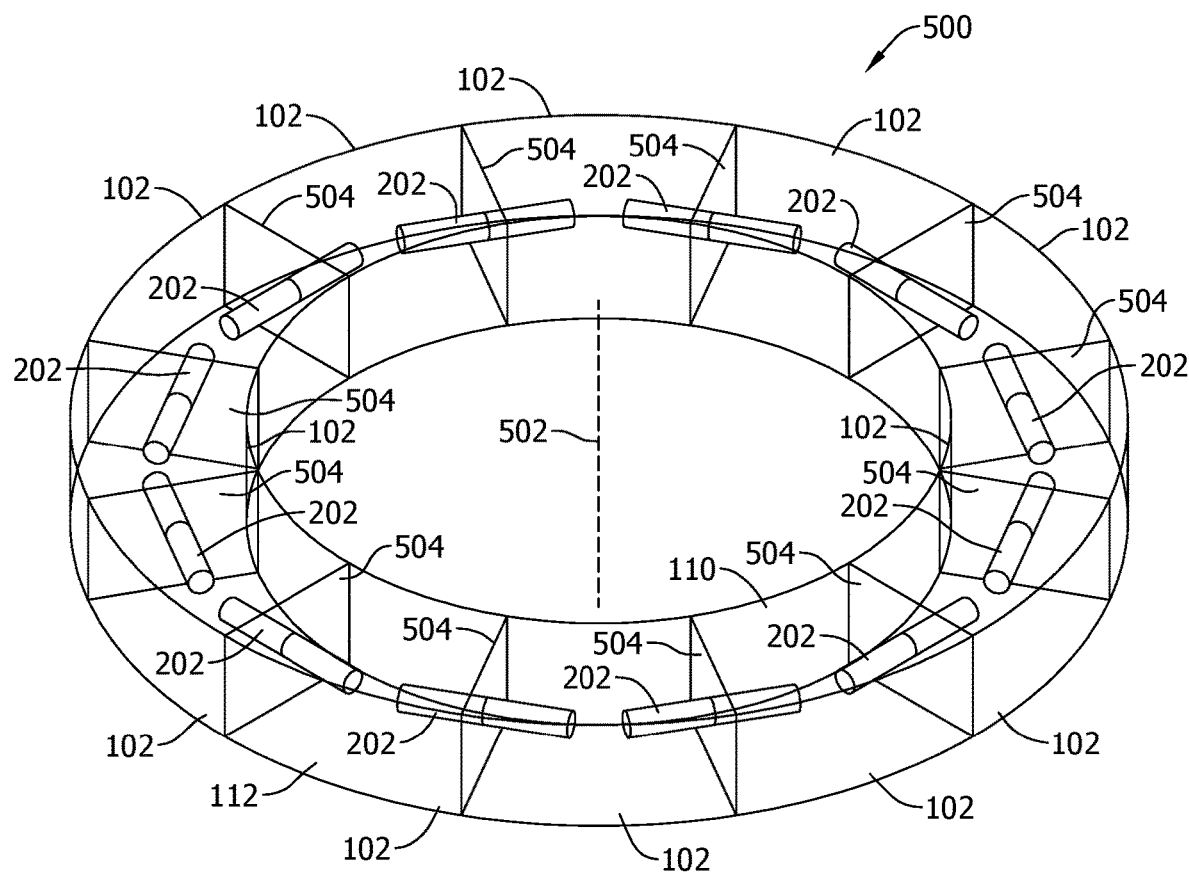
FIG. 7 is another perspective view of the magnetic assembly shown in FIG. 5, illustrating internal components of the magnetic assembly.

FIGS. 5-7 illustrate another example magnetic assembly 500 including a plurality of magnets 102 and a plurality of ferromagnetic pins 202. In this embodiment, magnets 102 are arranged as a cylindrical or circular Halbach array centered around an axis 502. As indicated by an arrow shown on each magnet 102, the polarity of each magnet 102 is rotated with respect to adjacent magnets 102 about an axis parallel to axis 502. The magnetic field of magnetic assembly 500 is largely contained within a region radially inward of strong side 110 of magnetic assembly 500. As shown in FIG. 6, each magnet 102 of magnetic assembly 500 is shaped as a radial arc segment, having two flat end surfaces 504 (i.e., at circumferential ends of the arc-shaped magnet 102). Each magnet 102 of magnetic assembly 500 includes two cavities 602. Each cavity 602 of a magnet 102 extends perpendicularly inward into the magnet 102 from one of the flat end surfaces 504. Each cavity 602 is sized and shaped to receive at least a portion of a respective pin 202 therein. In the embodiment illustrated in FIGS. 5-7, each ferromagnetic pin 202 has a length that is approximately equal to or less than twice the length of each cavity 602 such that, when assembled, one end of the ferromagnetic pin 202 is received in the cavity 602 of a first magnet 102, and the other end of the ferromagnetic pin 202 is received within the cavity 602 of a second magnet 102 that adjoins or abuts the first magnet 102 along end surface 504. Each cavity 602 of a magnet 102 aligns with a cavity 602 of an adjacent magnet 102 to facilitate a ferromagnetic pin 202 being received by each of a pair of adjacent cavities 602. As shown in FIG. 7, when assembled, magnets 102 are arranged in a circular array with flat end surfaces 504 of each magnet 102 adjoining or being positioned adjacent to flat end surfaces 504 of adjacent magnets 102. Each ferromagnetic pin 202 is positioned within cavities 602 of adjacent magnets 102 such that the ferromagnetic pin 202 extends from the cavity 602 defined in a first magnet 102 to the cavity 602 defined in a second magnet 102 adjoining or adjacent to the first magnet 102. As with the embodiments shown in FIGS. 1-3, the ferromagnetic pins 202 of magnetic assembly 500 are suitably sized and shaped and have a suitable magnetic permeability to reduce a magnetic repelling force between adjacent magnets 102, while minimizing the loss of magnetic material of the magnetic assembly 500.

Specific parameters (size, shape, and magnetic strength) of the magnetic assemblies of the present disclosure can vary based on the intended use or application of the Halbach array. Halbach arrays can be very small (millimeters in diameter or length) to very large (many meters in diameter or length). The magnets used in such Halbach arrays can be, for example and without limitation, cubes, rectangles or arc segments in geometrical shape. Exemplary applications of Halbach arrays of the present disclosure include, for example and without limitation windmill turbines, electric marine applications, MRI machines, electric vehicles, and medical implant components (e.g., magnetic couplings, high efficiency, light weight electric motors).

FIGS. 8-21 illustrate steps in an example analysis (e.g., finite element analysis) used to determine parameters (e.g., size and material) for the pin used in magnet assembly to reduce or eliminate magnetic forces between adjacent magnets.

Figure 8:
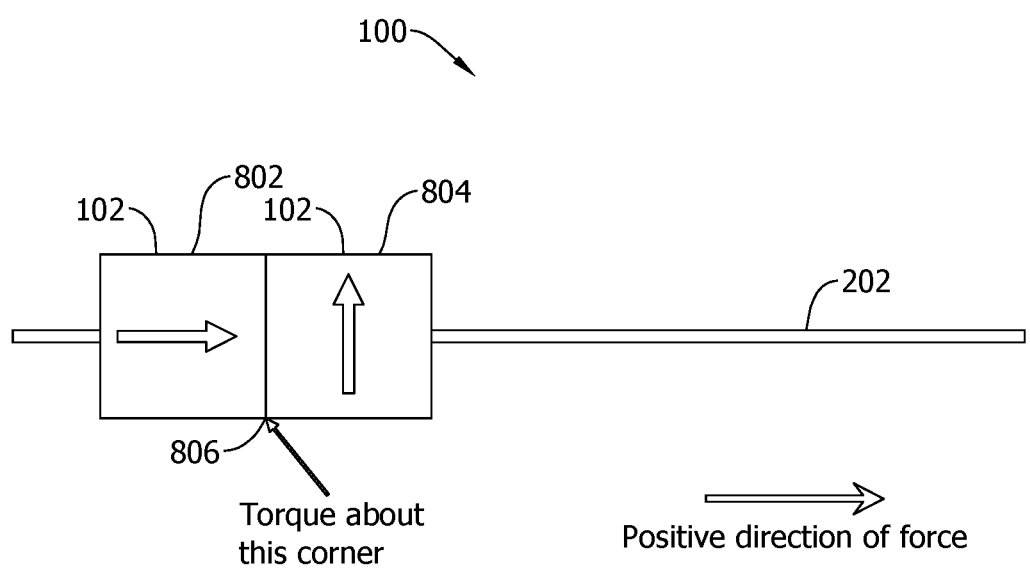
FIG. 8 is a side elevation view of the example magnetic assembly shown in FIGS. 1 and 2 in a partially assembled state.
Figure 9:
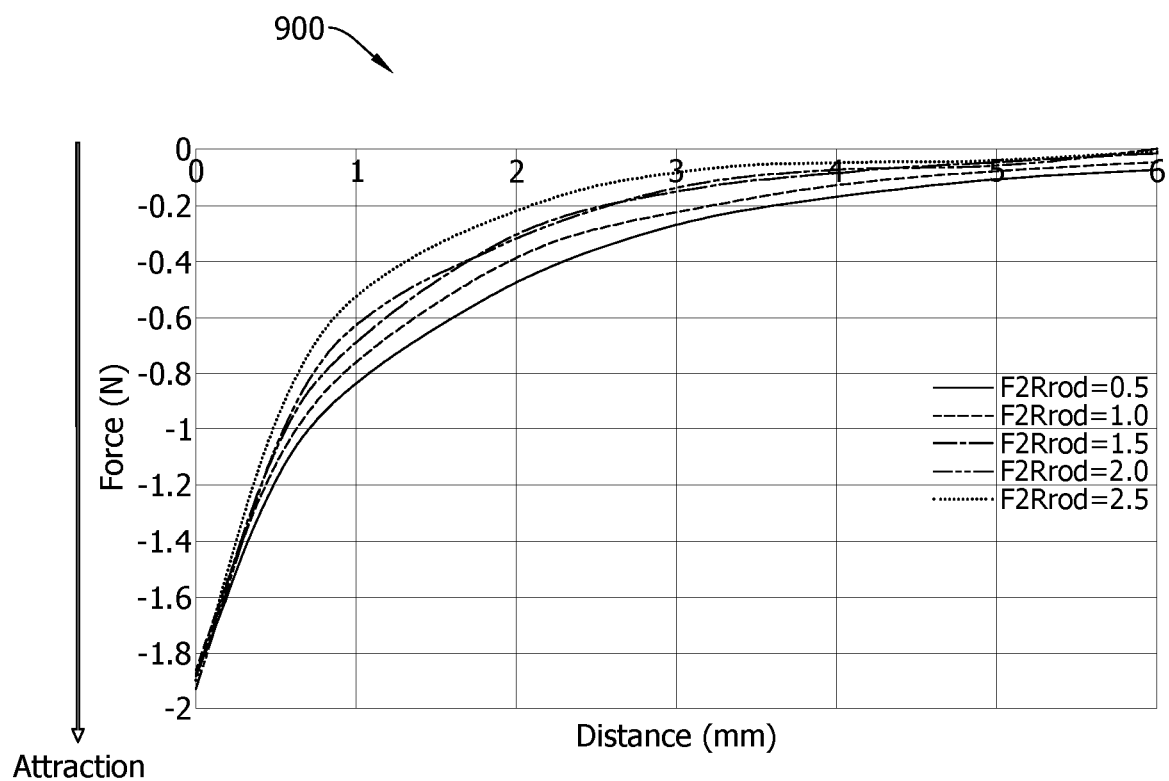
FIG. 9 is a graph illustrating the relationship between distance and magnetic force between adjacent magnets in the example magnetic assembly shown in FIG. 8 for rods of varying diameters.
Figure 10:
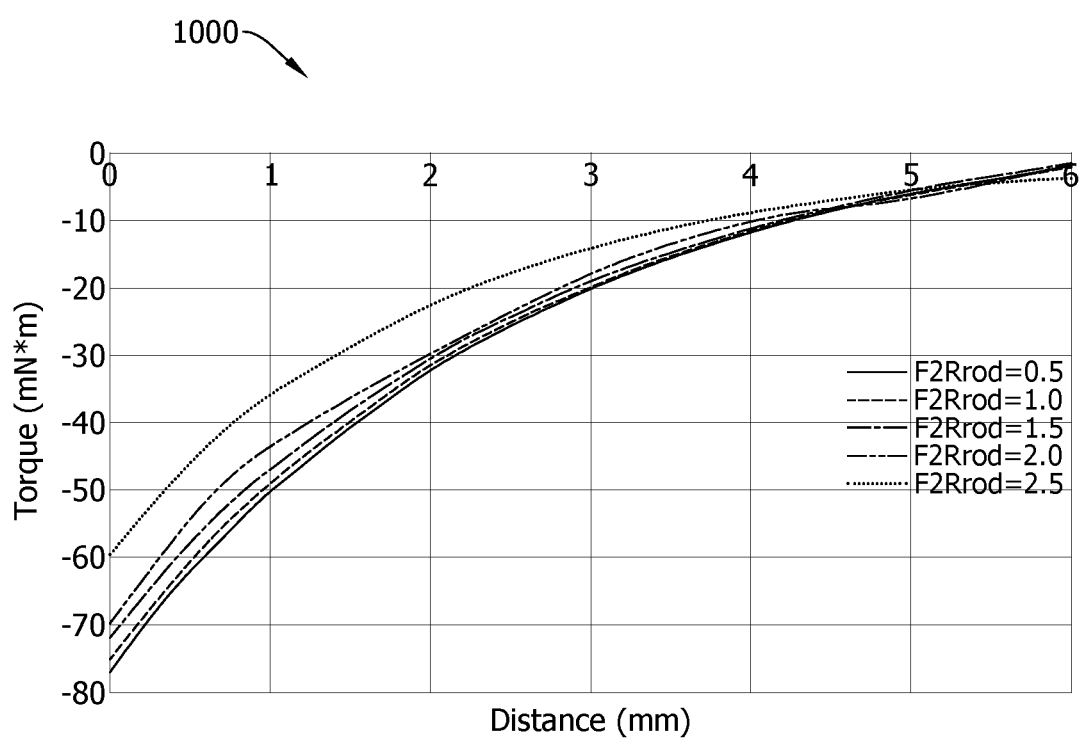
FIG. 10 is a graph illustrating the relationship between distance and torque resulting from magnetic forces between adjacent magnets in the example magnetic assembly shown in FIG. 8 for rods of varying sizes.

FIG. 8 is a side view of magnetic assembly 100 (shown in FIG. 1) in a partially assembled state. As shown in FIG. 8, magnetic assembly 100 includes a first magnet 802 and a second magnet 804 arranged in a two-magnet linear Halbach array along pin 202. FIG. 9 is a graph 900 illustrating the relationship between distance and magnetic force between adjacent magnets in the example magnetic assembly shown in FIG. 8 for cylindrical ferromagnetic pins 202 of varying diameters. More specifically, FIG. 9 illustrates the relationship between the distance between first magnet 802 and second magnet 804 (in millimeters, mm) and the magnetic force between first magnet 802 and second magnet 804 (in newtons, N) along an axis of the ferromagnetic pin 202. The relationship is shown for a plurality of different ferromagnetic pin diameters (0.5 millimeters, 1.0 millimeters, 1.5 millimeters, 2.0 millimeters, and 2.5 millimeters). FIG. 10 is a graph 1000 illustrating the relationship between distance and torque resulting from magnetic forces between adjacent magnets 102 in the example magnetic assembly 100 shown in FIG. 8. More specifically, FIG. 10 illustrates the relationship between the distance between first magnet 802 and second magnet 804 in millimeters (mm) and a torque in millinewton meters (mN·m) along a point 806 (shown in FIG. 8) located at a corner of first magnet 802 adjoining second magnet 804. The relationship is shown for the same ferromagnetic pin diameters as shown in FIG. 9.

As described in further detail herein, in some embodiments, the thickness or diameter of the ferromagnetic pin 202 is selected to reduce a repelling magnetic force or increase an attracting magnetic force between magnets 102. This selection may be balanced with selection of the ferromagnetic material of the pin 202 which determines the magnetic permeability of the pin 202.

Figure 11:
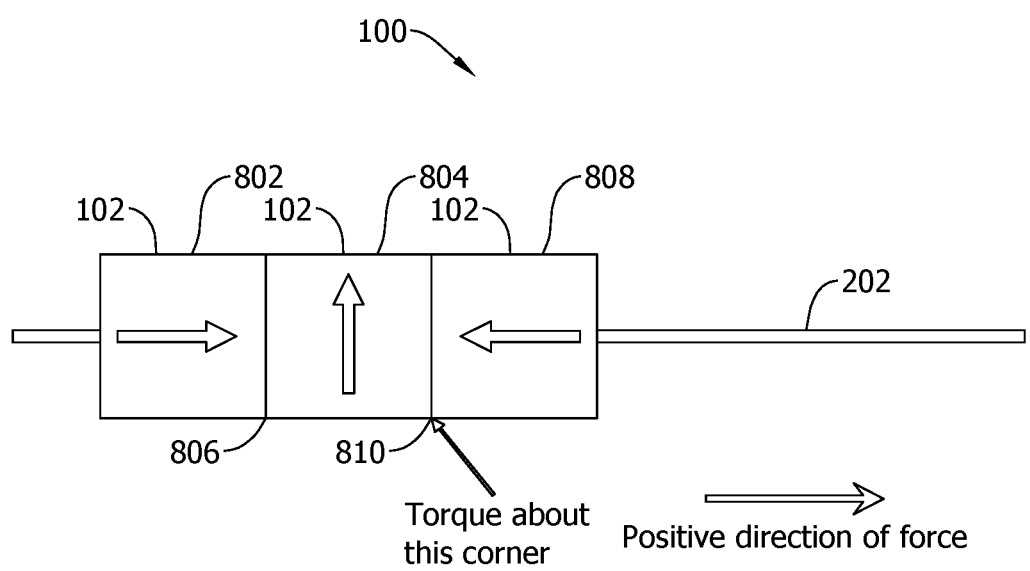
FIG. 11 is a side elevation view of the example magnetic assembly shown in FIGS. 1, 2, and 8 in a further partially assembled state.
Figure 12:
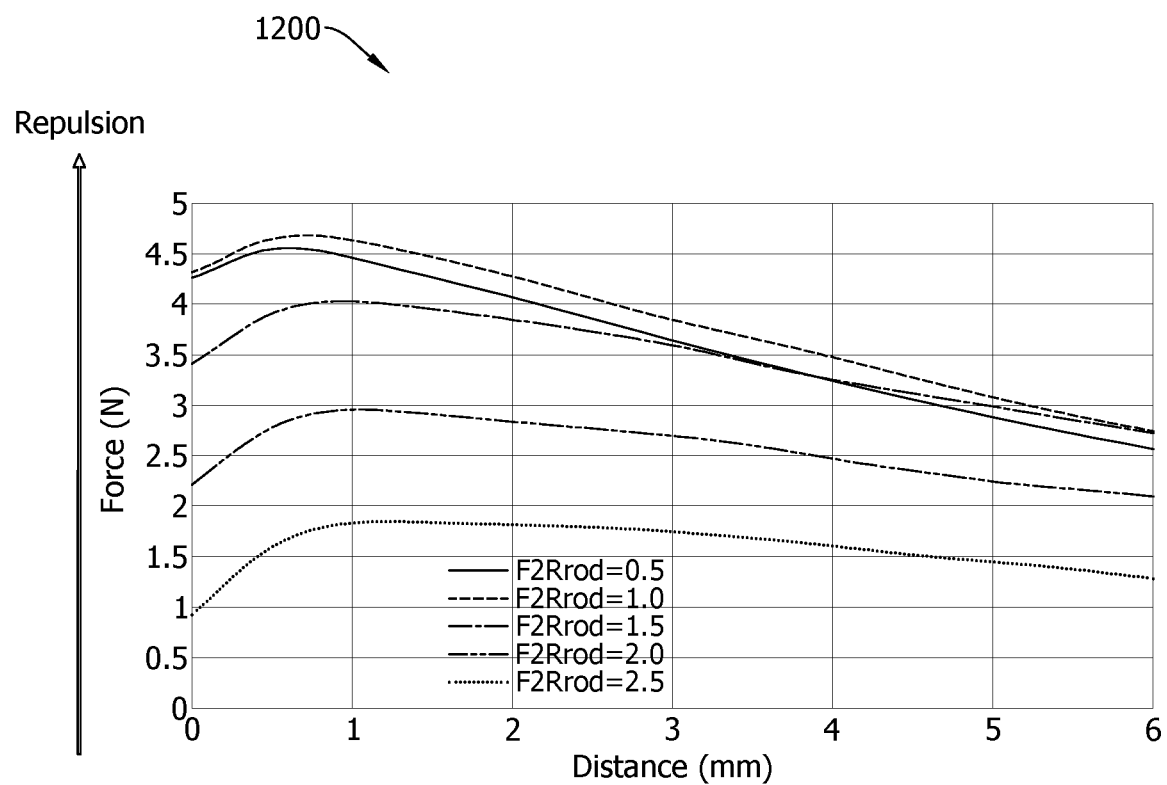
FIG. 12 is a graph illustrating the relationship between distance and magnetic force between adjacent magnets in the example magnetic assembly shown in FIG. 11 for rods of varying diameters.
Figure 13:
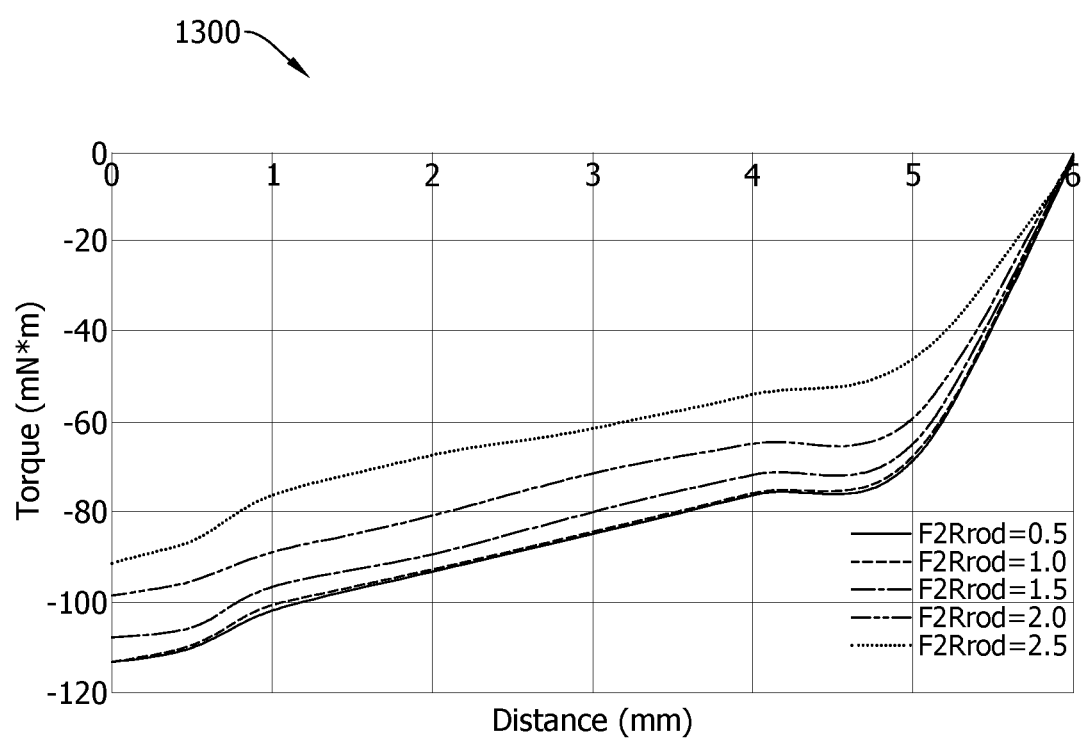
FIG. 13 is a graph illustrating the relationship between distance and torque resulting from magnetic forces between adjacent magnets in the example magnetic assembly shown in FIG. 11 for rods of varying diameters.

FIG. 11 is a side view of magnetic assembly 100 (shown in FIG. 1) in a further partially assembled state. More specifically, magnetic assembly 100 is shown in FIG. 11 with a third magnet 808 positioned adjacent to the second magnet 804. FIG. 12 is a graph 1200 illustrating a relationship between a distance between second magnet 804 and third magnet 808 in millimeters and a magnetic force between second magnet 804 and third magnet 808 in newtons (N) along an axis of the ferromagnetic pin 202. The relationship is shown for the same ferromagnetic pin diameters as shown in FIG. 9. FIG. 13 is a graph 1300 illustrating a relationship between the distance between second magnet 804 and third magnet 808 in millimeters (mm) and a torque in millinewton meters (mN·m) along a point 810 (shown in FIG. 11) located at a corner of second magnet 804 adjoining third magnet 808 resulting from magnetic forces between the adjacent magnets 804 and 808. The relationship is shown for the same ferromagnetic pin diameters as shown in FIG. 9.

Figure 14:
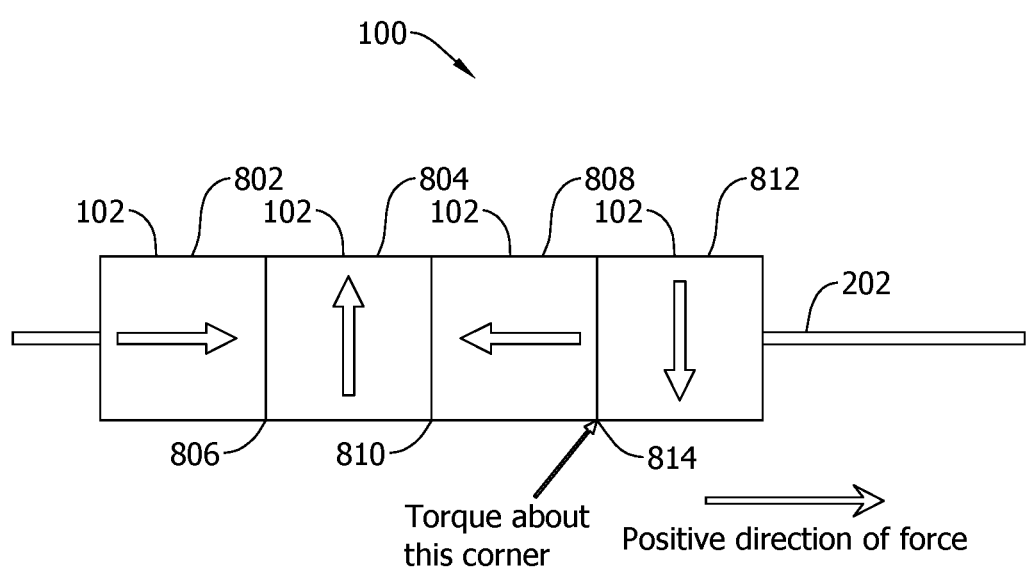
FIG. 14 is a side elevation view of the example magnetic assembly shown in FIGS. 1, 2, 8, and 11 in a further partially assembled state. This depicts Magnet 4 in position adjacent to Magnet 3.
Figure 15:
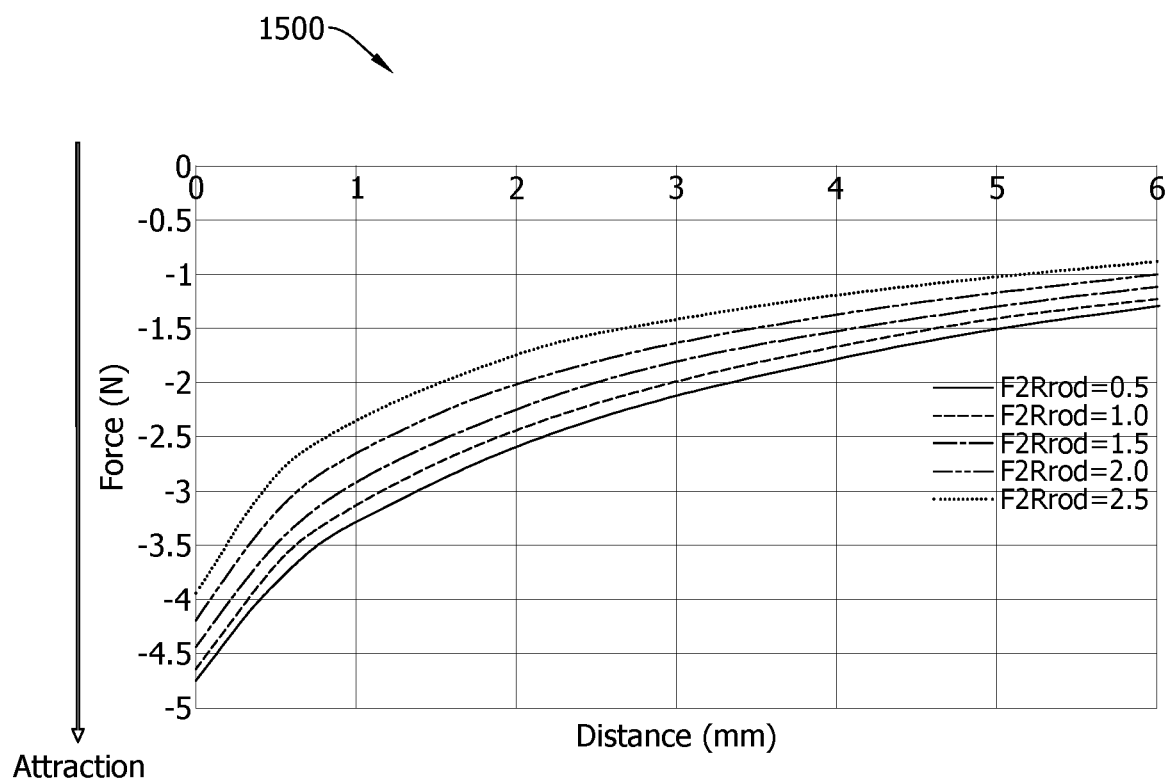
FIG. 15 is a graph illustrating the relationship between distance and magnetic force between adjacent magnets in the example magnetic assembly shown in FIG. 14 for rods of varying diameters.
Figure 16:
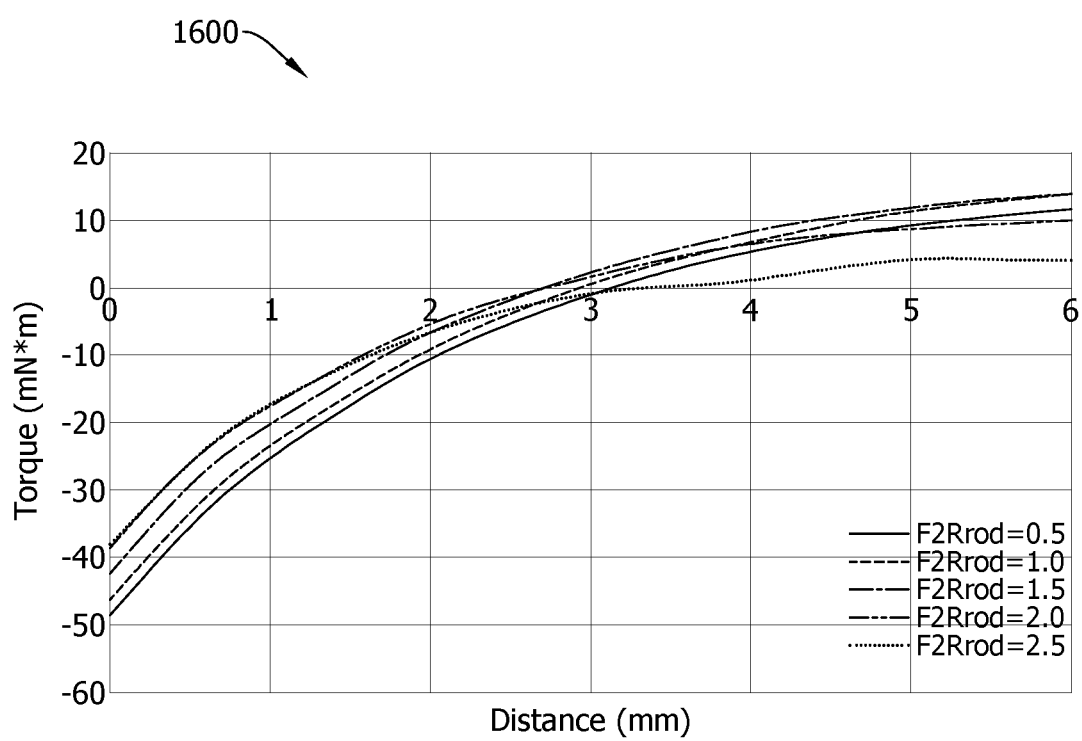
FIG. 16 is a graph illustrating the relationship between distance and torque resulting from magnetic forces between adjacent magnets in the example magnetic assembly shown in FIG. 14 for rods of varying diameters.

FIG. 14 is a side view of magnetic assembly 100 (shown in FIG. 1) in a further partially assembled state. More specifically, magnetic assembly 100 is shown in FIG. 14 with a fourth magnet 812 positioned adjacent to third magnet 808. FIG. 15 is a graph 1500 illustrating a relationship between a distance between third magnet 808 and fourth magnet 812 in millimeters and a magnetic force between third magnet 808 and fourth magnet 812 in newtons (N) along an axis of the ferromagnetic pin 202. The relationship is shown for the same ferromagnetic pin diameters as shown in FIG. 9. FIG. 16 is a graph 1600 illustrating the relationship between a distance between third magnet 808 and fourth magnet 812 in millimeters (mm) and a torque in millinewton meters (mN·m) along a point 814 (shown in FIG. 14) located at a corner of third magnet 808 adjoining fourth magnet 812 resulting from magnetic forces between the adjacent magnets 808 and 812. The relationship is shown for the same ferromagnetic pin diameters as shown in FIG. 9.

Figure 17:
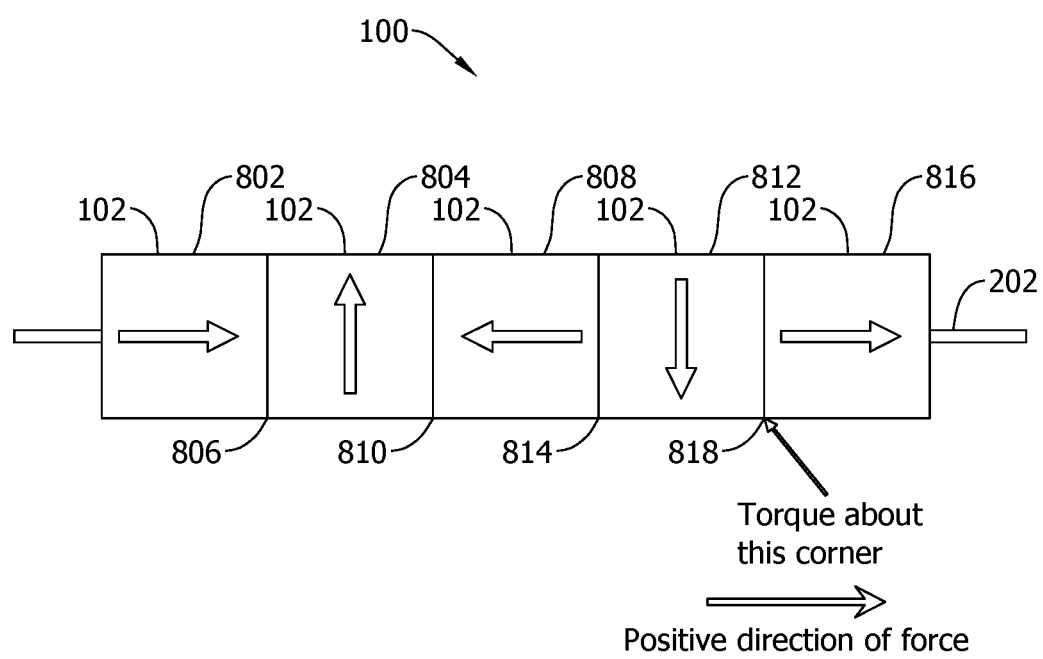
FIG. 17 is a side elevation view of the example magnetic assembly shown in FIGS. 1, 2, 8, 11, and 14 in an assembled state.
Figure 18:
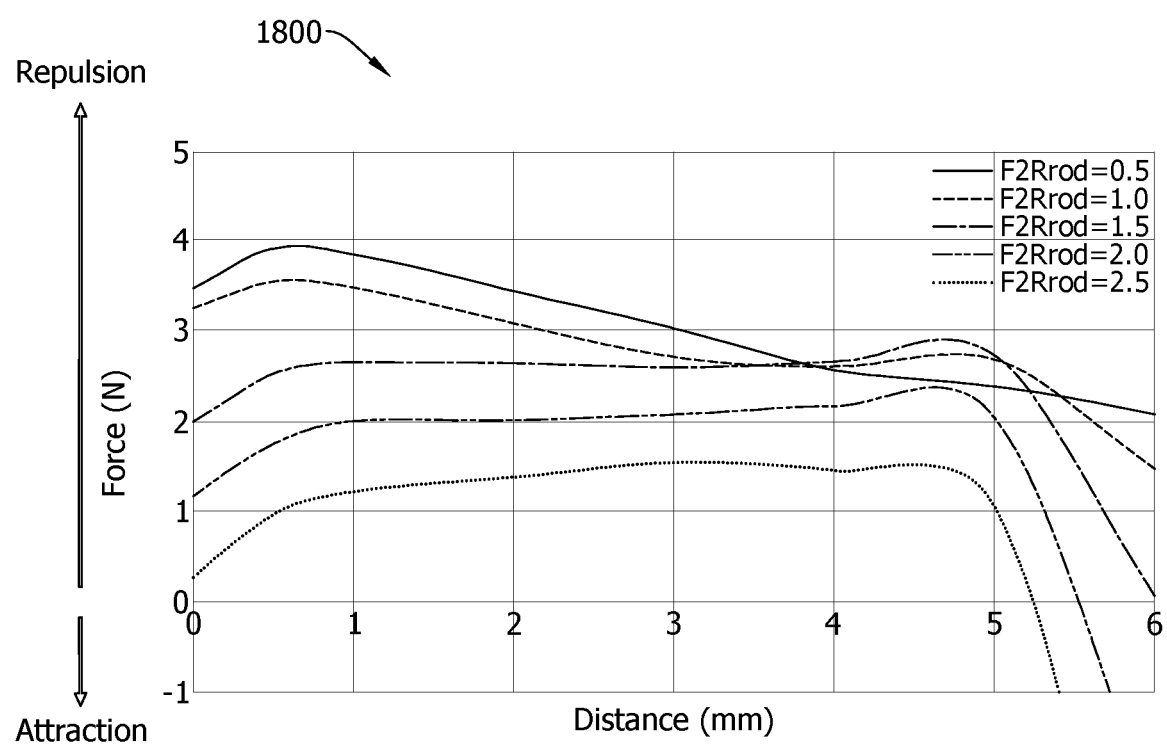
FIG. 18 is a graph illustrating the relationship between distance and magnetic force between adjacent magnets in the example magnetic assembly shown in FIG. 17 for rods of varying sizes and materials.
Figure 19:
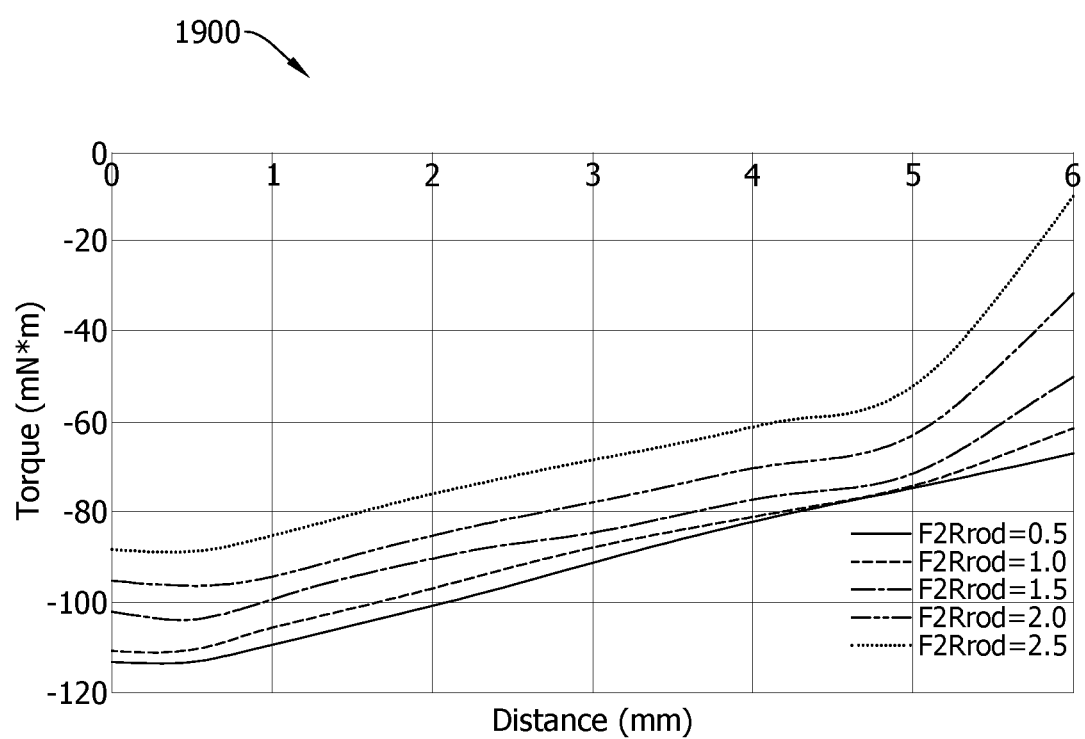
FIG. 19 is a graph illustrating the relationship between distance and torque resulting from magnetic forces between adjacent magnets in the example magnetic assembly shown in FIG. 17 for rods of varying sizes and materials.

FIG. 17 is a side view of magnetic assembly 100 (shown in FIG. 1) in a further partially assembled state. More specifically, magnetic assembly 100 is shown in FIG. 17 with a fifth magnet 816 positioned adjacent to fourth magnet 812. FIG. 18 is a graph 1800 illustrating a relationship between a distance between fourth magnet 812 and fifth magnet 816 in millimeters and a magnetic force between fourth magnet 812 and fifth magnet 816 in newtons (N) along an axis of the ferromagnetic pin 202. The relationship is shown for the same pin diameters as shown in FIG. 9. FIG. 19 is a graph 1900 illustrating the relationship between a distance between fourth magnet 812 and fifth magnet 816 in millimeters (mm) and a torque in millinewton meters (mN·m) along a point 818 (shown in FIG. 17) located at a corner of fourth magnet 812 adjoining fifth magnet 816 resulting from magnetic forces between the adjacent magnets 812 and 816. The relationship is shown for the same ferromagnetic pin diameters as shown in FIG. 9.

Figure 20:
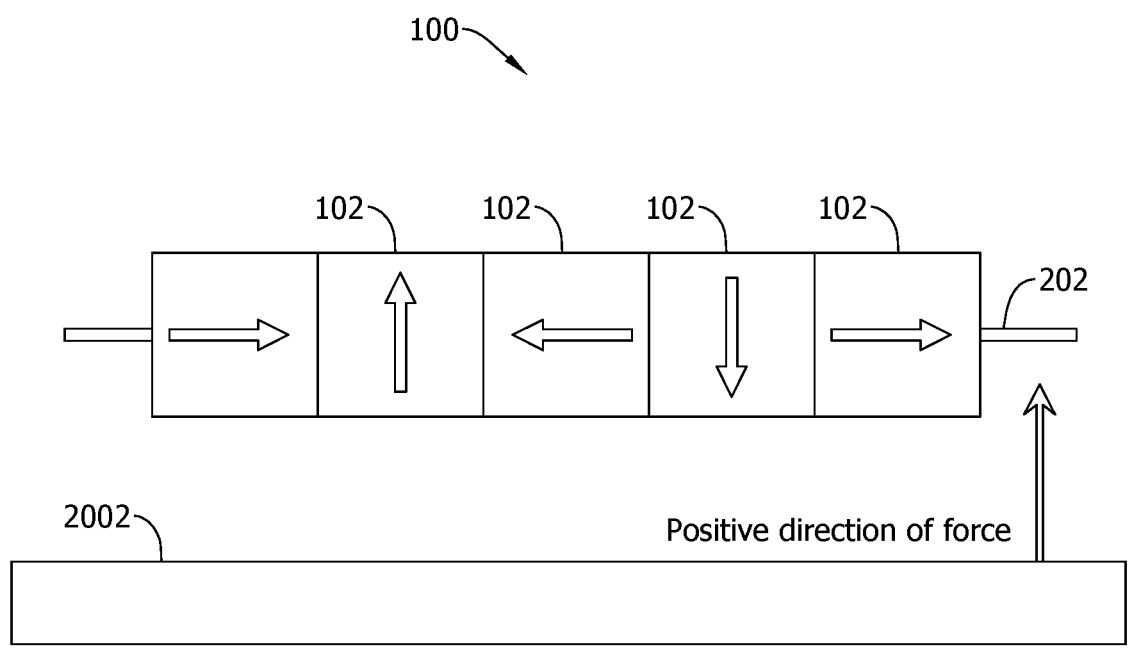
FIG. 20 is a side elevation view of the example magnetic assembly shown in FIG. 17 positioned proximate to a steel plate.
Figure 21:
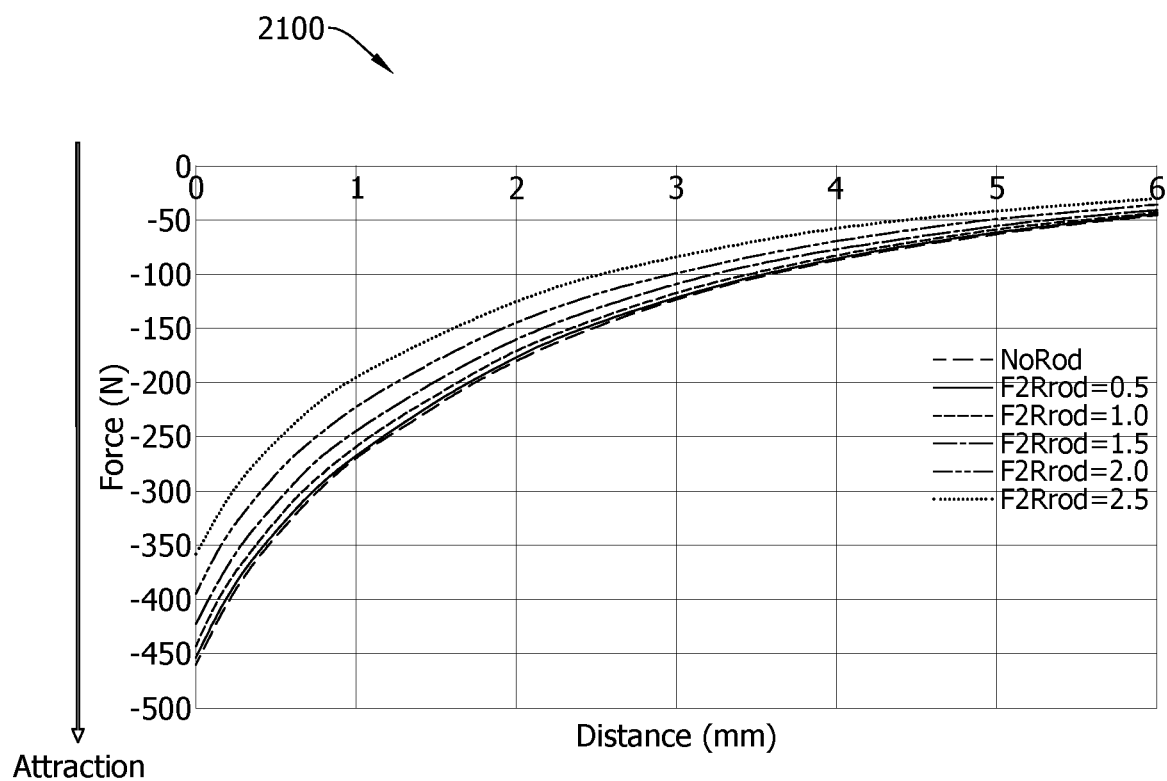
FIG. 21 is a graph illustrating the relationship between distance and magnetic force between the example magnetic assembly shown in FIG. 20 and the steel plate for rods of varying sizes and materials.

FIG. 20 is a side view of magnetic assembly 100 (shown in FIG. 1) disposed parallel to a surface of and at a distance from a ferromagnetic plate 2002 (e.g., a steel plate). FIG. 21 is a graph 2100 illustrating a relationship between the distance between magnetic assembly 100 and ferromagnetic plate 2002 in millimeters (mm) and a magnetic force between magnetic assembly 100 and ferromagnetic 2002 in newtons (N) in a direction normal to ferromagnetic plate 2002. The relationship is shown for the same pin diameters as shown in FIG. 9.

Graphs 900, 1200, 1500, 1800, and 2100 (shown respectively in FIGS. 9, 12, 15, 18, and 21) may be used to facilitate selecting a thickness for the ferromagnetic pin 202. For example, data from graph 2100 may be used to initially identify a desired pin thickness or diameter that results in a suitable (e.g., the greatest) attracting force between magnetic assembly 100 and another object, such as ferromagnetic plate 2002. Once the desired or preferred pin characteristics (e.g., thickness) are identified, data from graphs 900, 1200, 1500, and 1800 may be used to verify that the desired or preferred pin thickness will result in a net attracting force or minimal repelling force between each pair of adjacent magnets 102 of magnetic assembly 100. Additionally or alternatively, data from graphs 900, 1200, 1500, and 1800 may be used in conjunction with data from graph 2100 to select a ferromagnetic pin thickness or diameter that provides a suitable (e.g., a maximum) attracting force for magnetic assembly 100, while at the same time providing an attracting force or minimal repelling force between each pair of adjacent magnets 102 of magnetic assembly 100.

In the illustrated embodiment, for example, data from graph 2100 generally indicates that a thinner pin will provide the greatest magnitude of attracting force between magnetic assembly 100 and ferromagnetic plate 2002. Accordingly, in some embodiments, pin 202 is initially selected to have a relatively small thickness (e.g., 0.5 millimeters) to increase or maximize the magnetic strength of magnetic assembly 100.

Data from graphs 900, 1200, 1500, and 1800 may then be used verify that there is an attracting magnetic force between each pair of adjacent magnets 102 of magnetic assembly 100 for the desired or preferred thickness, or if a repelling magnetic force is present between a pair of adjacent magnets 102, the repelling force is sufficiently weak (e.g., less than 5 N, such as less than 3 N, or less than 1 N of repelling force). As illustrated in FIG. 9, for example, as the first two magnets 102 of magnetic assembly 100 (i.e., first magnet 802 and second magnet 804) approach each other on pin 202, the magnitude of the attracting magnetic force (as indicated by a negative force on graph 900) continues to increase for all pin sizes from a distance of approximately six millimeters until magnets 102 make contact (at distance 0 mm). This indicates that the desired pin thickness (i.e., a ferromagnetic pin with a diameter of 0.5 millimeters) has a suitable attracting force for use in magnetic assembly 100.

As indicated in graph 1200, however, there is a repelling magnetic force between second magnet 804 and third magnet 808 for each pin thickness. As indicated in graph 1200, the repelling force generally decreases as the thickness of the pin increases, thereby suggesting that a larger diameter pin should be used to minimize the repelling force between second magnet 804 and third magnet 808. Based on the data from graph 1200, for example, a ferromagnetic pin thickness of 1.5 or 2 millimeters may be selected to reduce the repelling force between second magnet 804 and third magnet 808, while maintaining the maximum overall attracting magnetic force of magnetic assembly 100. For example, turning back to FIG. 21, graph 2100 indicates that using a ferromagnetic pin thickness of 1.5 or 2 millimeters will reduce the overall attracting magnetic force of magnetic assembly 100, but will still provide a larger magnetic force as compared to using a ferromagnetic pin with the largest pin thickness on graph 2100 (i.e., 2.5 millimeters).

As illustrated in FIG. 15, there is an attracting magnetic force between third magnet 808 and fourth magnet 812 (as indicated by a negative force on graph 1500) for all pin sizes. This indicates that the pin thickness identified based on graphs 900, 1200, and 2100 (i.e., a ferromagnetic pin with a diameter of 1.5-2 millimeters) has a suitable attracting force for use in magnetic assembly 100.

As indicated in graph 1800 (shown in FIG. 18), there is a repelling magnetic force between fourth magnet 812 and fifth magnet 816 for each pin thickness and material when the fourth magnet 812 and fifth magnet 816 are positioned proximate one another (e.g., less than 5 mm apart from one another). As indicated in graph 1800, the repelling force generally decreases as the thickness of the pin increases, thereby suggesting that a larger diameter pin should be used to minimize the repelling force between fourth magnet 812 and fifth magnet 816. For example, the previously identified pin thicknesses of 1.5 millimeters and 2.0 millimeters provide a reduced repelling force between fourth magnet 812 and fifth magnet 816 as indicated in graph 1800, while still providing a relatively large overall magnetic force of magnetic assembly 100, as indicated in graph 2100.

The foregoing process can generally be applied to any type of Halbach array to facilitate assembling the Halbach array without the use of adhesives or other means to join adjacent magnets together. The process can be applied iteratively, with one of the primary starting objectives being to minimize the amount of magnetic material removed from the magnets in the Halbach array (i.e., using the smallest diameter rod possible), while at the same time achieving at least a minimal attracting force or at most a minimal repelling force between each magnet in the array.

Graphs 1000, 1300, 1600, and 1900 (shown respectively in FIGS. 10, 13, 16, and 19) illustrate an amount of torque being applied to the last-added magnet 102, which would cause magnets 102 to flip if not otherwise restrained. In certain embodiments, a ferromagnetic pin 202 with a thickness and magnetic characteristics resulting in a stronger torque may be selected, because the torque creates a binding force against pin 202, which keeps magnets 102 from sliding and helps hold magnets 102 in place. Additionally or alternatively, graphs 1000, 1300, 1600, and 1900 may be used to confirm that the torque applied on the last-added magnet 102 due to the magnetic interaction with other magnets in the magnetic assembly 100 will produce a sufficient binding effect or frictional force on the last-added magnet 102 to overcome any repelling forces. In the embodiment illustrated in FIGS. 8-21, for example, there is a repelling magnetic force between second magnet 804 and third magnet 808 for each pin thickness, as shown in FIG. 12. As noted above, a ferromagnetic pin thickness of 1.5 or 2 millimeters may be selected based on data from graph 1200. The torque data from FIG. 13 may then be used to verify that there is sufficient torque on third magnet 808 to create a sufficient binding or frictional force between the third magnet 808 and the pin 202. For example, FIG. 13 indicates that the torque on third magnet 808 increases as the ferromagnetic pin thickness decreases, and is greater than 100 millinewton meters (mN·m) for pin thicknesses less than 2.0 millimeters.

Similar analyses may be performed to facilitate selection of other parameters of magnetic assembly 100, such as a location of the ferromagnetic pin 202 relative to the magnets 102, a magnetic permeability of the ferromagnetic pin 202, and a number of ferromagnetic pins 202 included in magnetic assembly 100.

In some embodiments, the length of the ferromagnetic pin 202 may be selected to permit assembly of all magnets in the magnetic assembly 100. Once the magnetic assembly 100 is assembled, excess portions of the ferromagnetic pin 202 (e.g., portions of the ferromagnetic pin 202 extending beyond the first and last magnets 102) may be cut or removed to limit the size of the magnetic assembly 100. Additionally or alternatively, the ferromagnetic pin 202 may be subjected to one or more mechanical operations (e.g., machining, stamping, pressing, crimping, and combinations thereof) to form a stop or protrusion along the ferromagnetic pin 202 to facilitate keeping the magnets of magnetic assembly 100 in place. In yet other embodiments, multiple ferromagnetic pins may be used in magnetic assembly 100. For example, a two-pin magnetic assembly 100 may include a first ferromagnetic pin 202 that extends through three magnets 102, and a second ferromagnetic pin 202 that extends through another two magnets 102, where each of the first and second ferromagnetic pins 202 includes protrusions or stops at each end to inhibit movement of the magnets 102.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A magnetic assembly comprising:
a plurality of magnets arranged in a Halbach array having a strong side facing a first direction and a weak side facing a second direction opposite the first direction, the plurality of magnets comprising a first magnet and a second magnet positioned adjacent the first magnet, the first magnet having a first surface and the second magnet having a second surface adjacent the first surface, at least one first cavity being formed in the first magnet and extending inward from the first surface and at least one second cavity being formed in the second magnet and extending inward from the second surface, the first and second cavities being aligned along a third direction perpendicular to the first direction and the second direction; and
at least one ferromagnetic pin positioned within the at least one first cavity and the at least one second cavity to connect the first magnet and the second magnet, the at least one ferromagnetic pin having a size, a shape, and a magnetic permeability that facilitate a magnetic force between the first surface and the second surface in the third direction inducing a magnetic flux path through the at least one ferromagnetic pin such that an apparent magnetic force in the third direction between the first surface and the adjacent second surface is one of i) a repelling force less than 5 newtons (N) and ii) an attracting force.

2. The magnetic assembly of claim 1 wherein the apparent magnetic force in the third direction between the first surface and the adjacent second surface is an attracting force between 1 N and 10 N.

3. The magnetic assembly of claim 1, wherein the at least one ferromagnetic pin is connected to the first magnet and the second magnet by an interference fit within the at least one first cavity and the at least one second cavity, respectively.

4. The magnetic assembly of claim 1, wherein the at least one ferromagnetic pin is one of cylindrical and prism-shaped, and a cross-sectional area and a magnetic permeability of the at least one ferromagnetic pin facilitate the magnetic force between the first surface and the second surface in the third direction inducing the magnetic flux path through the at least one ferromagnetic pin.

5. The magnetic assembly of claim 1, wherein a void space volume created in the Halbach array by the at least one first cavity formed in the first magnet and the at least one second cavity formed in the second magnet reduces a magnetic field strength of the Halbach array by 5% or less.

6. The magnetic assembly of claim 1, wherein a flux density in the at least one ferromagnetic pin is less than a saturation flux density of the at least one ferromagnetic pin.

7. The magnetic assembly of claim 1, wherein the first surface and the adjacent second surface are in face-to-face contact.

8. The magnetic assembly of claim 1, wherein the at least one ferromagnetic pin is made from a magnetic material selected from the group consisting of ferritic stainless steel, low carbon steel, and iron-cobalt alloys.

9. The magnetic assembly of claim 1, wherein each of the plurality of magnets of the Halbach array is a rare earth magnet selected from the group consisting of samarium cobalt magnets and neodymium magnets.

10. The magnetic assembly of claim 1, wherein:
the plurality of magnets comprises a third magnet positioned adjacent the second magnet, the second magnet having a third surface opposite the second surface and the third magnet having a fourth surface adjacent the third surface, at least one third cavity being formed in the second magnet and extending inward from the third surface and at least one fourth cavity being formed in the third magnet and extending inward from the fourth surface, the third and fourth cavities being aligned along a fourth direction perpendicular to the first direction and the second direction; and
the magnetic assembly comprises at least one second ferromagnetic pin positioned within the at least one third cavity and the at least one fourth cavity to connect the second magnet and the third magnet, the at least one second ferromagnetic pin having a size, a shape, and a magnetic permeability that facilitate a magnetic force between the third surface and the fourth surface in the fourth direction inducing a magnetic flux path through the at least one second ferromagnetic pin such that an apparent magnetic force in the fourth direction between the third surface and the adjacent fourth surface is one of i) a repelling force less than 5 N and ii) an attracting force.

11. A magnetic assembly comprising:
a plurality of magnets arranged in a linear Halbach array having a strong side facing a first direction and a weak side facing a second direction opposite the first direction, each of the plurality of magnets shaped as a radial arc segment having opposing radial end surfaces, wherein an arc length of the Halbach array increases as the Halbach array extends along a longitudinal axis oriented perpendicular to the first direction and the second direction, each of the plurality of magnets having a through-hole defined therein extending from one radial end surface to the other radial end surface, wherein each through-hole is longitudinally aligned with a through-hole defined within an adjacent magnet; and a ferromagnetic pin positioned within each through-hole to connect adjacent magnets, wherein the ferromagnetic pin has a size, a shape, and a magnetic permeability that facilitate a magnetic force between a respective pair of adjacent magnets in the longitudinal direction inducing a magnetic flux path through the ferromagnetic pin such that an apparent magnetic force between each pair of adjacent magnets is one of i) a repelling force less than 5 newtons (N) and ii) an attracting force.

12. The magnetic assembly of claim 11, wherein the ferromagnetic pin is connected to each of the respective pair of adjacent magnets by an interference fit within each of the respective aligned through-holes.

13. The magnetic assembly of claim 11, wherein the ferromagnetic pin has one of a cylindrical shape and a prism shape, and a cross-sectional area and a magnetic permeability of the ferromagnetic pin facilitate the magnetic force between the respective pair of adjacent magnets in the longitudinal direction inducing the magnetic flux path through the ferromagnetic pin.

14. The magnetic assembly of claim 11, wherein the ferromagnetic pin is made from a magnetic material selected from the group consisting of ferritic stainless steel, low carbon steel, and iron-cobalt alloys.

15. The magnetic assembly of claim 11, wherein each of the plurality of magnets of the Halbach array is a rare earth magnet selected from the group consisting of samarium cobalt magnets and neodymium magnets.

16. The magnetic assembly of claim 11, wherein adjacent radial end surfaces of each pair of adjacent magnets are in face-to-face contact.

17. The magnetic assembly of claim 11, wherein the through-hole of each of the plurality of magnets extends through a center of each radial end surface of the respective magnet.

18. The magnetic assembly of claim 11, wherein at least one pair of adjacent magnets has multiple aligned through-holes formed in adjacent radial end surfaces of the at least one pair of adjacent magnets, each of the aligning through-holes having a ferromagnetic pin positioned therein to connect the at least one pair of adjacent magnets.

19. A method of assembling a magnetic assembly including a first magnet and a second magnet arranged in a Halbach array, the method comprising:

selecting a size of a ferromagnetic pin to connect the first magnet and the second magnet, wherein the size of the ferromagnetic pin is selected based on (i) a reduction in a magnetic repelling force between the first magnet and the second magnet resulting from the ferromagnetic pin and (ii) a reduction in a magnetic field strength of the Halbach array resulting from cavities formed in the first magnet and the second magnet to accommodate the ferromagnetic pin having the selected size; and inserting the ferromagnetic pin having the selected size into cavities in the first magnet and the second magnet to connect the first magnet and the second magnet.

20. The method of claim 19, wherein the magnetic assembly further includes a third magnet positioned adjacent the second magnet when assembled, the method further comprising:

after selecting the size of the ferromagnetic pin to connect the first magnet and the second magnet, performing an iterative analysis of the selected size by determining a reduction in the magnetic repelling force between the third magnet and the second magnet resulting from the ferromagnetic pin and a reduction in the magnetic field strength of the Halbach array resulting from cavities formed in the first magnet, the second magnet, and the third magnet to accommodate the ferromagnetic pin;

based on the iterative analysis, selecting the size of the ferromagnetic pin to connect the first magnet, the second magnet, and the third magnet; and inserting the ferromagnetic pin having the selected size into cavities formed in the first magnet, the second magnet, and the third magnet to connect the first magnet, the second magnet, and the third magnet.

\* \* \* \* \*